(12) United States Patent
Pawloski

(10) Patent No.: US 6,860,952 B2
(45) Date of Patent: Mar. 1, 2005

(54) METHOD FOR LAMINATING CLOSURE MEMBER TO FILM WEB

(75) Inventor: James C. Pawloski, Bay City, MI (US)

(73) Assignee: S. C. Johnson Home Storage, Inc., Racine, WI (US)

(*) Notice: Subject to any disclaimer, the term of this patent is extended or adjusted under 35 U.S.C. 154(b) by 549 days.

(21) Appl. No.: 10/075,064

(22) Filed: Feb. 13, 2002

(65) Prior Publication Data

US 2002/0074080 A1 Jun. 20, 2002

Related U.S. Application Data

(63) Continuation-in-part of application No. 09/640,402, filed on Aug. 15, 2000, now Pat. No. 6,562,165.

(51) Int. Cl.[7] .............................................. A44B 19/00
(52) U.S. Cl. ................ 156/66; 156/244.25; 156/244.27; 383/61.1; 383/61.2; 383/61.3; 383/97; 53/139.2; 24/585.12
(58) Field of Search .............................. 156/66, 244.25, 156/244.27, 244.11, 244.19; 383/61.1, 61.2, 61.3, 97, 65, 205; 24/585.12; 53/139.2

(56) References Cited

U.S. PATENT DOCUMENTS

| | | | |
|---|---|---|---|
| 3,462,332 A | 8/1969 | Goto ........................... | 156/244 |
| 3,846,209 A | 11/1974 | Howard ....................... | 156/502 |
| 3,852,386 A | 12/1974 | Behr ........................... | 264/49 |
| 3,904,468 A | 9/1975 | Noguchi ...................... | 256/244 |
| 4,101,355 A | 7/1978 | Ausnit ......................... | 156/66 |
| 4,279,677 A | 7/1981 | Takahashi .................... | 156/160 |
| 4,295,915 A | 10/1981 | Sakaguchi et al. .......... | 156/361 |
| 4,306,924 A | 12/1981 | Kamp ......................... | 156/66 |
| 4,341,575 A | 7/1982 | Herz ........................... | 156/66 |
| 4,355,494 A | 10/1982 | Tilman | |
| 4,404,056 A | 9/1983 | Kakehi et al. .......... | 156/244.11 |
| 4,428,788 A | 1/1984 | Kamp ........................... | 156/66 |
| 4,522,678 A | 6/1985 | Zieke .......................... | 156/501 |
| 4,555,282 A | 11/1985 | Yano ........................... | 156/66 |
| 4,582,549 A | 4/1986 | Ferrell ......................... | 156/66 |
| 4,601,694 A | 7/1986 | Ausnit | |
| 4,691,372 A | 9/1987 | Van Erden | |
| 4,691,373 A | 9/1987 | Ausnit ......................... | 383/63 |
| 4,755,248 A | 7/1988 | Geiger et al. .......... | 156/244.25 |
| 4,756,629 A | 7/1988 | Tilman et al. | |
| 4,812,056 A | 3/1989 | Zieke .......................... | 383/65 |
| 4,835,835 A | 6/1989 | Gould ......................... | 29/527.2 |
| 4,925,318 A | 5/1990 | Sorensen ...................... | 383/63 |
| 5,024,537 A | 6/1991 | Tilman ........................ | 383/63 |
| 5,035,517 A * | 7/1991 | Edelman ...................... | 383/204 |

(List continued on next page.)

FOREIGN PATENT DOCUMENTS

| | | | |
|---|---|---|---|
| GB | 826795 | 1/1960 | |
| GB | 1 546 433 | 10/1976 | ................... 33/24 |

*Primary Examiner*—Blaine Copenheaver
*Assistant Examiner*—Barbara J. Musser

(57) ABSTRACT

Methods for forming a thermoplastic film with an attached closure strip are disclosed. The film can be used to produce zippered reclosable plastic bags. The methods include providing a thermoplastic film web having a sealing surface and a closure strip having a binding surface, both being in a non-melted condition. The film web and the closure strip are aligned in non-overlapping relationship and a heated thermoplastic binder layer is positioned on the film web sealing surface and on the closure strip binding surface quickly after extrusion. The hot binder layer transfers enough heat to the closure strip and to the film web to melt the closure strip binding surface and the film web sealing surface. Pressure is applied to seal the closure strip to the film web. An apparatus for practicing the method and a reclosable bag formed from the thermoplastic film with attached closure strips are also disclosed.

7 Claims, 14 Drawing Sheets

U.S. PATENT DOCUMENTS

| | | |
|---|---|---|
| 5,188,461 A | 2/1993 | Sorensen ..................... 383/63 |
| 5,238,517 A | 8/1993 | Heyes ........................ 156/243 |
| 5,335,997 A | 8/1994 | Kanemitsu et al. ........... 383/63 |
| 5,405,561 A | 4/1995 | Dais et al. .................. 264/40.1 |
| 5,605,594 A | 2/1997 | May ..................... 156/244.22 |
| 5,705,011 A | 1/1998 | Bodford et al. ........ 156/244.22 |
| 5,749,658 A | 5/1998 | Kettner ....................... 383/204 |
| 5,827,163 A | 10/1998 | Kettner ....................... 493/211 |
| 6,110,586 A | 8/2000 | Johnson |
| 6,273,984 B1 | 8/2001 | Bourdelais et al. .... 156/244.11 |
| 6,769,229 B2 * | 8/2004 | Kinigakis et al. ............. 53/412 |

\* cited by examiner

METHOD FOR LAMINATING CLOSURE MEMBER TO FILM WEB

CROSS-REFERENCES TO RELATED APPLICATIONS

This application is a continuation-in-part of U.S. application Ser. No. 09/640,402 filed Aug. 15, 2000 now U.S. Pat. No. 6,562,165.

STATEMENT REGARDING FEDERALLY SPONSORED RESEARCH

Not Applicable.

BACKGROUND OF THE INVENTION

1. Field of the Invention

The present invention relates to methods for attaching closure members, i.e., a zipper tape, to a plastic film web. It appears especially well suited for laminating zipper elements to plastic storage bags so as to form reclosable storage bags.

2. Description of the Related Art

The prior art has developed reclosable plastic storage bags for use in protecting food items and for other storage purposes. A film of a plastic such as polyethylene is provided with a closure member (one half of a zipper) on its opposed ends. The film is then folded to bring the zipper halves adjacent to each other, with the sides of the bag then being heat sealed. The bag can then be opened or closed in the usual manner by interlocking the zipper elements.

One difficulty experienced by manufacturers of reclosable plastic storage bags involves the joining of the closure members to the bag film web portion. Care must be taken to ensure that the closure members are positioned properly on the bag film web. Further, there should be no wrinkles or creases in the area of the bag in which the fastener profiles and bag film web are joined.

A variety of methods are known for attaching closure members to a plastic film web prior to forming reclosable plastic storage bags. One approach has been to form the bag film web and the closure members in a single extrusion operation. See e.g. U.S. Pat. Nos. 3,338,284 and 3,852,386. The disclosure of these publications and of all other publications referred to herein are incorporated by reference as if fully set forth herein.

A second approach utilizes an adhesive, such as a strip of tape or glue, to join a closure member to a bag film web. For example, U.S. Pat. No. 4,101,355 discloses a reclosable bag film forming process wherein a web and closure member are joined by a liquid adhesive which is supplied by an applicator having a nozzle. After the adhesive is applied, the web and closure members are pressed together by a presser roll and a backing roll. See also U.S. Pat. Nos. 4,835,835, 4,341,575 and 3,226,787.

A third approach involves the use of a pre-formed bag film web and a pre-formed closure member which are drawn from separate stock rolls. The bag film web and/or closure member are then heated and joined. For example, U.S. Pat. No. 3,846,209 discloses a method for producing a closure member-containing bag film wherein a pre-formed plastic film is fed from a stock roll into a sealing station. A separate closure strip from a second stock roll is also fed into the sealing station. In the sealing station, the closure strip and plastic film are welded together by a pair of heating bars.

A fourth approach uses a pre-formed bag film web drawn from a supply roll and then joined to a relatively freshly extruded closure member. For example, U.S. Pat. No. 3,904,468 discloses a method of making a reclosable bag film wherein a web of bag film material is unwound from a stock roll and then transferred to a heating station having a heating roll on which the film is heated to a desired temperature. The film is then transferred to a heated joining roll wherein the film is joined to the freshly extruded fastener profile strips. See also U.S. Pat. Nos. 4,279,677 and 4,582,549.

Another variation on this fourth approach is disclosed in U.S. Pat. No. 4,555,282 which discloses a method of bonding a closure member to a bag film web wherein a closure member having a base portion and a fastener profile portion is extruded shortly before being bonded to a bag film web. Intermediate the extrusion of the closure member and its joinder to the bag film web, the fastener profile portion of the closure member is cooled (and thereby solidified and stabilized) while the base portion is left heated (and thereby remains thermoplastic) when the closure member is joined to the film. U.S. Pat. No. 4,306,924 discloses another variation on this fourth approach wherein the film web is extruded on to a casting roll to join an already formed closure member.

A fifth approach involves the extrusion of a bag film web and a closure member in close proximity to each other, and the joinder of the bag film web and closure member to each other shortly after extrusion. For example, U.S. Pat. No. 4,428,788 discloses a method for forming a reclosable bag wherein a film, a tape, and a closure member are extruded by three separate dies. The film, tape and closure member dies are positioned so that the film, tape and closure members contact each other while still at a temperature of above 200° F. A chill roll is provided for cooling the film, tape and closure members.

U.S. Pat. No. 4,295,915 discloses an apparatus for forming a reclosable bag film wherein a fastener profile and its base strip are extruded integrally, and then joined to a film web. The die for extruding the bag film web is disposed adjacent to the fastener die block so that the fastener profile and bag film are joined shortly after both are extruded. See also U.S. Pat. Nos. 3,462,332 and 4,522,678.

A sixth approach involves the extrusion of a bag film web having a relatively thinner first portion and a relatively thicker second portion, and the separate extrusion of male and female fastener profiles that are joined to the thicker second portions before the thicker second portions have cooled. An example of this approach is found in U.S. Pat. No. 4,755,248.

A seventh approach involves attaching a closure member for a storage bag to the bag via an intermediate heat setting adhesive. See e.g. U.S. Pat. Nos. 5,749,658 and 5,827,163.

However, to keep the costs of producing such bags to the minimum it is desirable to use high speed equipment to form these bags. Prior methods may not achieve a consistent seal between the closure members and the film web (and may introduce tension differences across the film web) when run at a very high speed. In addition, room for improvement exists in the fabrication of a reclosable bag which can be manufactured to consistently high quality standards.

There is therefore still a need for improved methods of attaching closure elements to plastic film such as that used in forming reclosable storage bags.

SUMMARY OF THE INVENTION

The invention provides methods for forming a thermoplastic film having a closure strip. In one method, one provides a thermoplastic film web having a sealing surface, the temperature of the film web being below a melting temperature of the film web. One also provides a thermoplastic closure strip having a binding surface, the temperature of the closure strip being below a melting temperature of the closure strip. One extrudes a thermoplastic binder layer, and then positions the binder layer between the sealing surface of the film web and the binding surface of the closure strip. The binder layer contacts the sealing surface of the film web before the binder layer has cooled to a temperature below the melting temperature of the film web and the binder layer also contacts the binding surface of the closure strip before the binder layer has cooled to a temperature below the melting temperature of the closure strip. Pressure applied to the film web and the closure strip binds the closure strip and film web to the binder layer.

In another method, one provides a thermoplastic film web having a sealing surface, the temperature of the film web being below a melting temperature of the film web, and one also provides a thermoplastic closure strip having a binding surface, the temperature of the closure strip being below a melting temperature of the closure strip. One then positions the film web and the closure strip such that the film web and the closure strip are not in overlapping relationship. (When used with reference to methods according to the invention, the term "non-overlapping" or "not in overlapping" relationship or "do not overlap" means that if the film web and the closure strip are both on a horizontal plane or were to be oriented such that both the film web and the closure strip were on a horizontal plane, no part of the film web would be on top of the closure strip and no part of the closure strip would be on top of the film web.) One extrudes a thermoplastic binder layer, and positions the binder layer on the sealing surface of the film web and on the binding surface of the closure strip such that the binder layer contacts the sealing surface of the film web before the binder layer has cooled to a temperature below the melting temperature of the film web and the binder layer contacts the binding surface of the closure strip before the binder layer has cooled to a temperature below the melting temperature of the closure strip. Pressure is then applied to the binder layer so as to bind the closure strip and film web to the binder layer.

In preferred forms, there can be multiple closure strips (such as interlockable male and female strips), multiple binder layers (one binding each of the strips to the web), and the invention can be practiced on a folded web at opposite ends of the web.

In another aspect, there is a first cylindrical roller having a surface and an axis of rotation and a second cylindrical roller having a surface and an axis of rotation, the axis of the first roller and the axis of the second roller being substantially coplanar, the first roller and the second roller being aligned in spaced apart relationship such that a pinch area is formed between the surface of the first roller and the surface of the second roller. One feeds a continuous length of a thermoplastic film web having a sealing surface, such that the film web wraps on the surface of the first roller, while the temperature of the film web is below a melting temperature of the film web; and feeds a continuous length of a thermoplastic closure strip having a binding surface such that the closure strip is wraps on the surface of the second roller, while the temperature of the closure strip is below a melting temperature of the closure strip. One extrudes a thermoplastic binder layer, positions the binder layer between the sealing surface of the film web and the binding surface of the closure strip, and feeds the film web, binder layer and closure strip through the pinch area such that the binder layer contacts the sealing surface of the film web before the binder layer has cooled to a temperature below the melting temperature of the film web. The binder layer contacts the binding surface of the closure strip before the binder layer has cooled to a temperature below the melting temperature of the closure strip.

In yet another aspect, there is a first cylindrical roller having a surface and an axis of rotation and a second cylindrical roller having a surface and an axis of rotation, the axis of the first roller and the axis of the second roller being substantially coplanar, the first roller and the second roller being aligned in spaced apart relationship such that a pinch area is formed between the surface of the first roller and the surface of the second roller. One feeds a continuous length of a thermoplastic film web having a sealing surface, such that the film web wraps on the surface of the first roller, while the temperature of the film web is below a melting temperature of the film web; and feeds a continuous length of a thermoplastic closure strip having a binding surface such that the closure strip wraps on the surface of the second roller, while the temperature of the closure strip is below a melting temperature of the closure strip. One extrudes a thermoplastic binder layer, positions the binder layer on the sealing surface of the film web and on the binding surface of the closure strip, and feeds the film web, binder layer and closure strip through the pinch area such that the film web and the closure strip are not in overlapping relationship and such that the binder layer contacts the sealing surface of the film web before the binder layer has cooled to a temperature below the melting temperature of the film web and the binder layer contacts the binding surface of the closure strip before the binder layer has cooled to a temperature below the melting temperature of the closure strip.

In another method, one forms a folded thermoplastic film having a female closure strip and a male closure strip at opposed ends of the film. One step is to provide a first cylindrical roller having a surface and an axis of rotation and a second cylindrical roller having a surface and an axis of rotation, the axis of the first roller and the axis of the second roller being substantially coplanar, the first roller and the second roller being aligned in spaced apart relationship such that a first pinch area is formed between the surface of the first roller and the surface of the second roller. Another step is to provide a third cylindrical roller having a surface and an axis of rotation and a fourth cylindrical roller having a surface and an axis of rotation, the axis of the third roller and the axis of the fourth roller being substantially coplanar, the third roller and the fourth roller being aligned in spaced apart relationship such that a second pinch area is formed between the surface of the third roller and the surface of the fourth roller. One then feeds a continuous length of a folded thermoplastic film web having a first sealing surface on a first edge spaced apart from a fold line of the film web and a second sealing surface on a second edge spaced apart from the fold line of the film web such that the first edge of the film web wraps on the surface of the first roller and the second edge of the film web wraps on the surface of the third roller, while the temperature of the film web is below a melting temperature of the film web. One also feeds a continuous length of a thermoplastic female closure strip having a binding surface, such that the female closure strip wraps on the surface of the second roller, while the temperature of the female closure strip is below a melting temperature of the female closure strip. Another step is to extrude a first thermoplastic binder layer and then position the first binder layer between the first sealing surface of the film web and the binding surface of the female closure strip. One then feeds the film web and the female closure strip through the first pinch area such that the first binder layer contacts the first sealing surface of the film web before the first binder layer has cooled to a temperature below the melting temperature of the film web and the first binder layer contacts the binding surface of the female closure strip before the first binder layer has cooled to a temperature below the melting temperature of the female closure strip. One also feeds a continuous length of a thermoplastic male closure strip having a binding surface, no such that the male closure strip wraps on the surface of the fourth roller, while the temperature of the male closure strip is below a melting temperature of the male closure strip. Another step is to extrude a second thermoplastic binder layer and position the second binder layer between the second sealing surface of the film web and the binding surface of the male closure strip. One then feeds the film web and the male closure strip through the second pinch area such that the second binder layer contacts the second sealing surface of the film web before the second binder layer has cooled to a temperature below the melting temperature of the film web and the second binder layer contacts the binding surface of the male closure strip before the second binder layer has cooled to a temperature below the melting temperature of the male closure strip.

In another aspect, the invention provides an apparatus for forming a thermoplastic film having a closure strip. There is a cylindrical lamination roller having a surface and an axis of rotation. There is also a cylindrical lay-on roller having a surface and an axis of rotation. The axis of the lamination roller and the axis of the lay-on roller are substantially coplanar, and the lamination roller and the lay-on roller are aligned in spaced apart relationship such that a pinch area is formed between the surface of the lamination roller and the surface of the lay-on roller. There is also a web feed roller for feeding a continuous length of a thermoplastic film web having a sealing surface, the web feed roller being positioned such that the film web can wrap on the surface of the lamination roller after leaving the web feed roller. Another element is a closure strip feed roller for feeding a continuous length of a thermoplastic closure strip having a binding surface, the closure strip feed roller being positioned such that a closure strip can wrap on the surface of the lay-on roller. An extruder can extrude a heated thermoplastic binder layer, the extruder including a die block with an opening, and the extruder being positioned such that the opening in the die block is adjacent the pinch area so as to be suitable to direct a heated binder layer between a nonheated closure strip and a nonheated film web.

In yet another aspect, the invention provides an apparatus for forming a thermoplastic film having a closure strip. There is a cylindrical lamination roller having a surface and an axis of rotation. There is also a cylindrical lay-on roller having a surface and an axis of rotation. The axis of the lamination roller and the axis of the lay-on roller are substantially coplanar, and the lamination roller and the lay-on roller are aligned in spaced apart relationship such that a pinch area is formed between the surface of the lamination roller and the surface of the lay-on roller. There is also a web feed roller for feeding a continuous length of a thermoplastic film web having a sealing surface, the web feed roller being positioned such that the film web can wrap on the surface of the lamination roller after leaving the web feed roller. Another element is a closure strip feed roller for feeding a continuous length of a thermoplastic closure strip having a binding surface, the closure strip feed roller being positioned such that a closure strip can wrap on the surface of the lay-on roller. The web feed roller and the closure strip feed roller are positioned such that the film web and the closure strip are aligned in non-overlapping relationship on the lamination roller and the lay-on roller. An extruder can extrude a heated thermoplastic binder layer, the extruder including a die block with an opening, and the extruder being positioned such that the opening in the die block is adjacent the pinch area so as to be suitable to direct a heated binder layer on a nonheated closure strip and on a nonheated film web. (When used with reference to any apparatus according to the invention, the term "non-overlapping" or "not in overlapping" relationship means that if the film web and the closure strip are both on a horizontal plane or were to be oriented such that both the film web and the closure strip were on a horizontal plane, no part of the film web would be on top of the closure strip and no part of the closure strip would be on top of the film web.)

In yet another aspect, the invention provides an apparatus for forming a thermoplastic film having a closure strip. There is a cylindrical lamination roller having a surface and an axis of rotation. There is also a cylindrical lay-on roller having a surface and an axis of rotation. The axis of the lamination roller and the axis of the lay-on roller are substantially coplanar, and the lamination roller and the lay-on roller are aligned in spaced apart relationship such that a pinch area is formed between the surface of the lamination roller and the surface of the lay-on roller. There is also a web feed roller for feeding a continuous length of a thermoplastic film web having a sealing surface, the web feed roller being positioned such that the film web can wrap on the surface of the lamination roller after leaving the web feed roller. Another element is a closure strip feed roller for feeding a continuous length of a thermoplastic closure strip having a binding surface, the closure strip feed roller being positioned such that a closure strip can also wrap on the surface of the lamination roller. Preferably, the web feed roller and the closure strip feed roller are positioned such that the film web and the closure strip are aligned in non-overlapping relationship on the lamination roller and the lay-on roller. An extruder can extrude a heated thermoplastic binder layer, the extruder including a die block with an opening, and the extruder being positioned such that the opening in the die block is adjacent the pinch area so as to be suitable to direct a heated binder layer on a nonheated closure strip and on a nonheated film web.

The above methods and equipment permit the production of film webs with closure members assembled thereon at very high speeds (e.g. about 200 linear feet per minute). When the methods are used to form bags, the seal between the bag and zipper will be highly reliable and consistently formed (thus permitting an airtight structure).

Particularly preferred thermoplastics for the film web are low or high density polyethylene, linear low density polyethylene, polypropylene, nylon, and interpolymers of ethylene and one or more monomers copolymerizable therewith.

It is particularly preferred to have the closure members formed from the same thermoplastic as the film web. However, this is not essential. It is also preferred that the binder layer be formed from the same thermoplastic as the film web. However, this is also not essential.

It is particularly important that the binder layer thickness be sufficiently great so as to carry enough heat to create a melted region adjacent the binder layer when the binder layer contacts the closure members and the film web. At the same time, the binder layer should be sufficiently thin so as to create a stable cooled structure in under a second after the binder layer is pressed between a closure member and the film web.

In still another aspect, the invention provides a reclosable thermoplastic bag comprising a first panel, a second opposed panel, a reclosable zipper, a first thermoplastic binder layer, and a second thermoplastic binder layer. The first panel and the second panel are formed from a thermoplastic film, and the first panel and the second panel are connected along a pair of sides and a bottom bridging the pair of sides such that an opening is formed between the pair of sides. The reclosable zipper extends along the opening, and the zipper includes (i) a thermoplastic female closure strip having a female closure profile on an inner surface of the female closure strip and a flange portion below the female closure profile, the flange portion of the female closure strip having a first binding surface, and (ii) a thermoplastic male closure strip having a male closure profile on an inner surface of the male closure strip and a flange portion below the male closure profile, the flange portion of the male closure strip having a second binding surface. The female closure profile and the male closure profile are configured to interlock with one another. The first thermoplastic binder layer is bonded to the flange portion of the female closure strip and is bonded adjacent the opening to a first sealing surface of the first panel. The second thermoplastic binder layer is bonded to the flange portion of the male closure strip and bonded adjacent the opening to a second sealing surface of the second panel. The bag is constructed such that the first panel and the female closure strip are not in overlapping relationship. (When used with reference to reclosable bags according to the invention, the term "non-overlapping" or "not in overlapping" relationship means that if both the first panel and the female closure strip are on a horizontal plane or were to be oriented such that both the first panel and the female closure strip were on a horizontal plane, no part of the first panel would be on top of the female closure strip and no part of the female closure strip would be on top of the first panel. Likewise, if both the second panel and the male closure strip are on a horizontal plane or were to be oriented such that both the second panel and the male closure strip were on a horizontal plane, no part of the second panel would be on top of the male closure strip and no part of the male closure strip would be on top of the second panel.)

It is an advantage of the present invention to provide a rapid method for attaching prefabricated thermoplastic closure members to prefabricated thermoplastic film webs traveling at high speeds.

This and still other advantages of the present invention will be apparent from the description of the embodiments which follow.

DETAILED DESCRIPTION OF THE INVENTION

Figure 1:
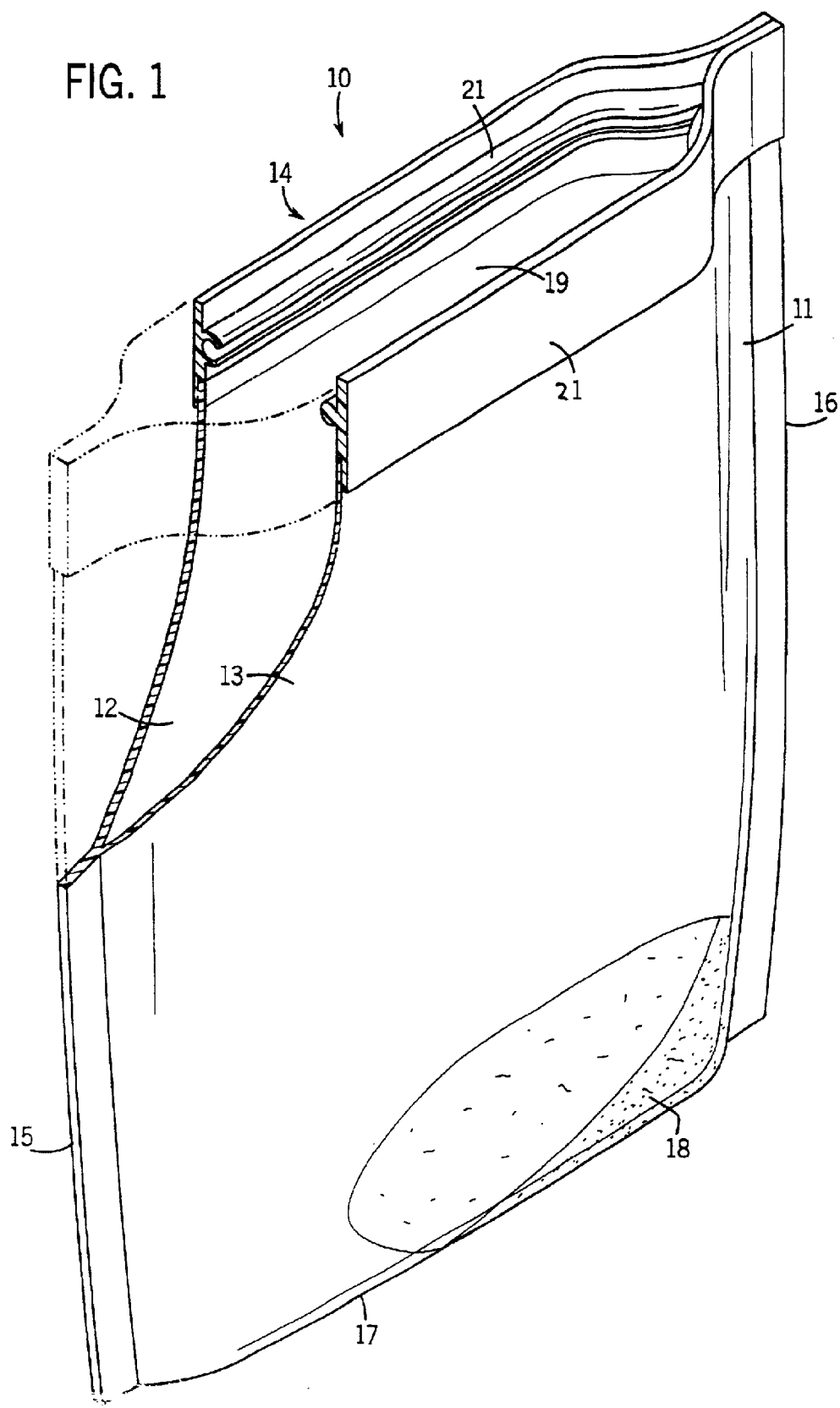
FIG. 1 is a perspective view of a reclosable plastic bag made in accordance with the present invention.
Figure 2:
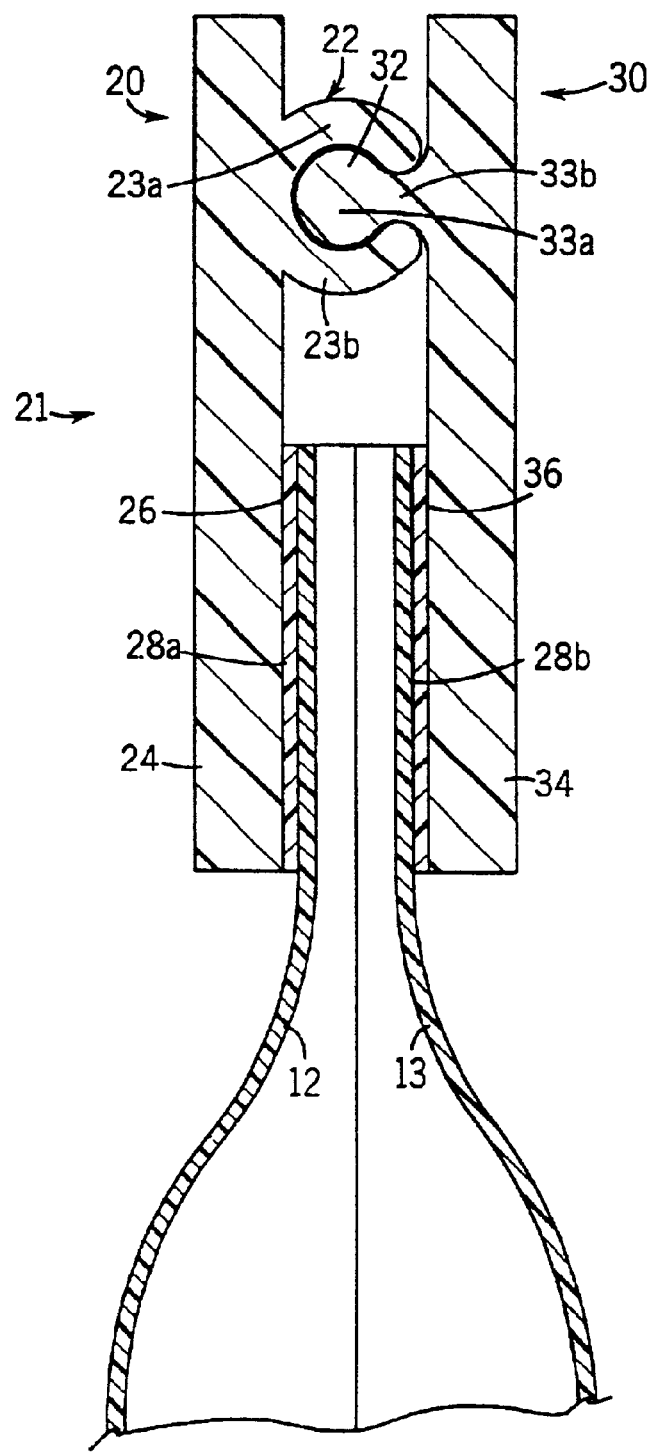
FIG. 2 is a partial cross sectional view of the closure arrangement of FIG. 1, albeit when the bag is closed.

Referring to FIGS. 1 and 2, there is shown a flexible bag 10 made of first and second opposed panel sections 12, 13 from a polymeric film. The sections are heat sealed together along a pair of side edges 15, 16, and a bottom edge 17 in order to form a pocket 19 within the interior of the bag 10. The pocket 19 may be used to hold a product 18, such as a variety of "left over" edible food substances, or non-edible products. Access to the interior of the bag 10 is provided through an opening 14.

Sections 12, 13 may be made of any thermoplastic resin capable of forming a flexible film. Specific thermoplastic resinous films are chosen to provide adequate tensile strength, tear strength, pressure resistance, impact strength, and the like, for the end use desired, at minimal cost for the selected use. Low or high density polyethylene, linear low density polyethylene, polypropylene, nylon, and interpolymers of ethylene and one or more monomers copolymerizable therewith are typically preferred. Suitable thicknesses generally fall within the range of 0.025 mm to 0.254 mm, preferably from about 0.038 mm to about 0.114 mm. The film can be formed from a single layer of thermoplastic resin or it may be formed as a multilayer structure.

Flexible bag 10 includes a zipper type closure 21 extending from side edge 15 to side edge 16. Female closure strip 20 includes an elongated inward profile 22 attached to or integrally formed with female closure strip 20, and the male closure strip 30 includes an elongated projecting profile 32 attached to or integrally formed with male closure strip 30. The inward profile 22 and the projecting profile 32 cooperate by snap interlocking to allow bag 10 to be opened and reclosed in the usual manner. As illustrated in FIG. 2, the projecting profile 32 has a cross section which is generally tree-shaped including an expanded head portion 33a and a narrower trunk portion 33b. The locking structure of the inward profile 22 includes first and second arcs 23a and 23b with a cross section which mechanically engage the head 33a of the male projecting profile 32 to reclose bag 10.

The female closure strip 20 also includes a flange portion 24, and the male closure strip 30 also includes a flange portion 34. The inner surface 26 of the flange portion 24 is configured for attachment to the panel 12 of the bag 10, and the inner surface 36 of the flange portion 34 is configured for attachment to the panel 13 of the bag 10. The zipper 21 is permanently attached to bag 10 by adhering the inner surface 26 of the flange portion 24 of the female closure strip 20 to the panel 12 via binder layer 28a, and adhering the inner surface 36 of the flange portion 34 of the male closure strip 30 to the panel 13 via binder layer 28b. In an alternative version of the bag, the zipper 21 is permanently attached to the bag by adhering an outer surface of the flange portion of the female closure strip to the exterior of the panel 12 via binder layer 28a, and adhering an outer surface of the flange portion of the male closure strip to the exterior of the panel 13 via binder layer 28b. (In the present specification, the terms 'inner', 'outer', 'exterior' and 'interior' refer to spatial relationships with respect to a formed bag.)

The female closure strip 20 and the male closure strip 30 of the zipper 21 can be made of any thermoplastic resin suitable for forming a reclosable bag zipper. Thermoplastic resins preferred for use in forming the zipper of the present invention include low or high density polyethylene, linear low density polyethylene, polypropylene, nylon, and interpolymers of ethylene and one or more monomers copolymerizable therewith. Suitable thicknesses for the flange portion 24 of the female closure strip 20 and for the flange portion 34 of the male closure strip 30 generally fall within the range of from about 0.076 mm to 0.305 mm, preferably from about 0.152 mm to 0.229 mm. Again, the female closure strip 20 and the male closure strip 30 can be formed from a single layer of thermoplastic resin or they may be formed as a multilayer structure having a plurality of layers.

The binder layer 28a and the binder layer 28b may comprise any thermoplastic resin suitable for bonding the male and female closure members and the film used to form the opposed panel sections 12, 13. Thermoplastic resins suitable for use in the binder layer 28a and the binder layer 28b of the present invention include low or high density polyethylene, linear low density polyethylene, polypropylene, nylon, and interpolymers of ethylene and one or more monomers copolymerizable therewith. Suitable thicknesses for the binder layers 28a/28b generally fall within the range of about 0.025 mm to about 0.152 mm, preferably from about 0.025 mm to 0.102 mm. The binder layers can be formed from a single layer of thermoplastic resin or may be formed as a multilayer structure having a plurality of layers. The width of the binder layer 28a and the binder layer 28b (as measured in a direction extending from the bottom edge 17 of the bag 10 toward the zipper 21) generally fall within the range of about 1.27 mm to 6.35 mm, preferably from about 3.175 mm to 4.445 mm.

Figure 3:
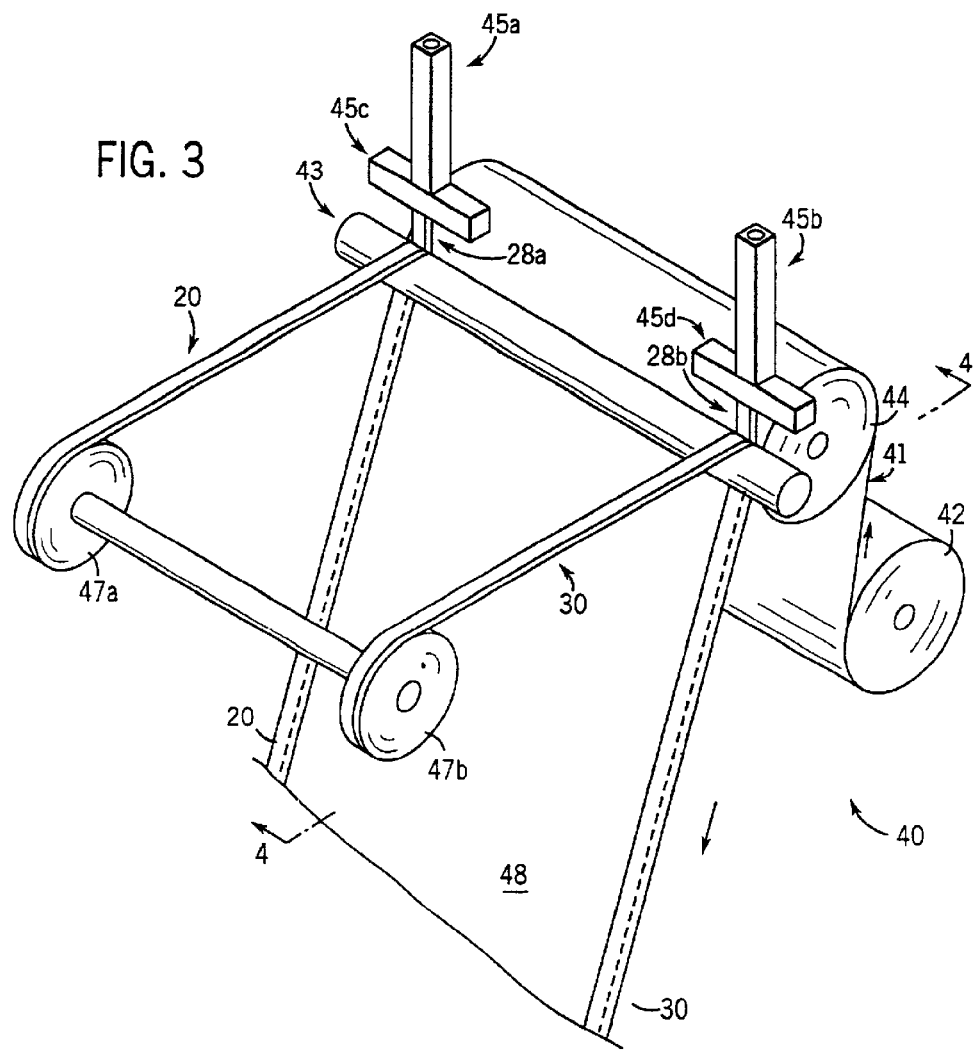
FIG. 3 is a perspective view of an apparatus in accordance with the invention.
Figure 4:
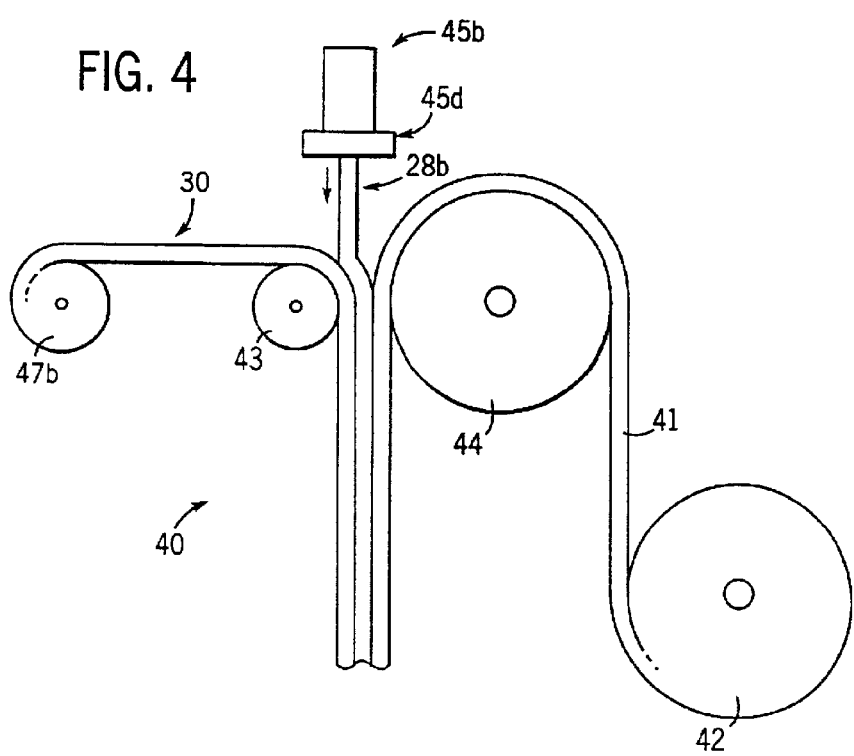
FIG. 4 is a side view of the apparatus of FIG. 3.

FIGS. 3 and 4 show an apparatus that may be used to manufacture a bag film with closure members (one half of a zipper) on its opposed ends. The bag film can then be folded to bring the zipper halves adjacent to each other and heat sealed along the side edges to form a reclosable bag 10.

Lamination apparatus 40 includes a bag film supply roll 42 for supplying a bag film web 41 wound into a roll, a female closure strip supply roll 47a for supplying the female closure strip 20, a male closure strip supply roll 47b for supplying the male closure strip 30, a binder layer extruder 45a for supplying the –15 binder layer 28a, a binder layer extruder 45b for supplying binder layer 28b, and a lamination roller 44 and a lay-on roller 43 which cooperate to squeeze binder layer 28a between one edge of bag film web 41 and the inner surface 26 of the flange portion 24 of the female closure strip 20 and to squeeze binder layer 28b between an opposite edge of bag film web 41 and the inner surface 36 of the flange portion 34 of the male closure strip 30.

The binder layer extruders 45a and 45b may include a hopper (not shown) for receiving plastic material, a body (not shown) which contains a heating means for heating the plastic material into a molten state, and a screw auger (not shown) for advancing the molten plastic material to and through die blocks 45c and 45d. The die blocks 45c and 45d include a die slot (not shown) configured such that the binder layers 28a and 28b extruded from the extruders 45a and 45b have a cross-sectional shape similar to the cross-sectional shape of the die slot.

The bag film web 41 is prefabricated using known techniques such as extrusion and is rolled up for storage on the bag film supply roll 42. The female closure strip 20 is also prefabricated using known techniques such as extrusion and is rolled up for storage on the female closure strip supply roll 47a. The male closure strip 30 is likewise prefabricated using known techniques such as extrusion and is rolled up for storage on the male closure strip supply roll 47b. The bag film web 41 is fed from the bag film supply roll 42 at a temperature that is below the melting temperature of the film web 41 (typically room temperature) and then wraps on the lamination roller 44 to stabilize the bag film web 41.

At the same time, the female closure strip 20 is fed from the female closure strip supply roll 47a at a temperature that is below the melting temperature of the female closure strip 20 (preferably room temperature) and the male closure strip 30 is fed from the male closure strip supply roll 47b at a temperature that is below the melting temperature of the male closure strip 30 (preferably room temperature). The female closure strip 20 and the male closure strip 30 then wrap opposite ends of the lay-on roller 43.

In an alternate version of the apparatus, the bag film web 41 may be fed directly from an extruder after cooling to a temperature that is below the melting temperature of the film web 41 (typically room temperature) and then wrapped on the lamination roller 44 to stabilize the bag film web 41. At the same time, the female closure strip 20 may be fed directly from an extruder after cooling to a temperature that is below the melting temperature of the female closure strip 20 (preferably room temperature) and the male closure strip 30 may be fed directly from an extruder after cooling to a temperature that is below the melting temperature of the male closure strip 30 (preferably room temperature). The female closure strip 20 and the male closure strip 30 then wrap opposite ends of the lay-on roller 43.

The binder layer extruders 45a and 45b are positioned in the apparatus 40 such that binder layers 28a and 28b are placed on the inner surface 26 of the flange portion 24 of the female closure strip 20 and the inner surface 36 of the flange portion 34 of the male closure strip 30 respectively just prior to the female closure strip 20 and the bag film web 41 being squeezed between the lay-on roller 43 and the lamination roller 44 and just prior to the male closure strip 30 and the bag film web 41 being squeezed between the lay on roller 43 and the lamination roller 44. During operation of the binder layer extruders 45a and 45b, the draw-down of the binder layers 28a and 28b is about 11.5 cm from a 1.9 cm width die.

The temperature of the binder layers 28a and 28b at the die blocks 45c and 45d is typically about 127° C. The binder layers 28a and 28b transfer enough heat to the flange portion 24 of the female closure strip 20 and the flange portion 34 of the male closure strip 30 respectively to melt a surface of flange portion 24 of the female closure strip 20 and a surface of flange portion 34 of the male closure strip 30. The binder layers 28a and 28b also transfer enough heat to the edges of the bag film web 41 to melt the edges of the bag film web 41.

It is particularly important that the binder layer thickness and width be sufficiently great so as to carry enough heat to create a melting surface adjacent the binding layers 28a and 28b. At the same time, the binding layers 28a and 28b must be sufficiently thin so as to create a stable cooled structure in a short period of time (typically under one second after the binding layers 28a and 28b contact the edges of the bag film web 41). Likewise, the die blocks 45c and 45d of the binder layer extruders 45a and 45b must be located sufficiently near the female closure strip 20, the male closure strip 30, and the edges of the bag film web 41 so that the binder layers 28a and 28b retain enough heat after moving away from the die blocks 45c and 45d such that the binder layers 28a and 28b melt the female closure strip 20, the male closure strip 30, and the edges of the bag film web 41.

The pressure applied by the lay-on roller 43 and the lamination roller 44 keeps the melted flange portion 24 of the female closure strip 20 in contact with the melted binder layer 28a and keeps the melted portion of the bag film web 41 in contact with the melted binder layer 28a at that point in the web path such that the female closure strip 20 is sealed to one longitudinal edge of the base film web 41 when the melted flange portion 24 of the female closure strip 20, the melted binder layer 28a and the melted portion of the bag film web 41 cool. Likewise, the pressure applied by the lay on roller 43 and the lamination roller 44 keeps the melted flange portion 34 of the male closure strip 30 in contact with the melted binder layer 28b and keeps the melted portion of the bag film web 41 in contact with the melted binder layer 28b at that point in the web path such that the male closure strip 30 is sealed to the other longitudinal edge of the base film web 41 when the melted flange portion 34 of the male closure strip 30, the melted binder layer 28b and the melted portion of the bag film web 41 cool.

For example, the apparatus 40 can seal a polyethylene female closure strip 20 having a flange portion 24 with a thickness of about 0.190 mm to a polyethylene bag film web 41 having a thickness of about 0.076 mm with a polyethylene binder layer 28a having a thickness of about 0.063 mm and a width (as measured in a direction extending from the bottom edge 17 of the bag 10 toward the zipper 21) of about 3.81 mm. Because the dimensions of the polyethylene binder layer 28a are small compared to the dimensions of the flange portion 24 of the female closure strip 20 and the dimensions of the melted portion of the bag film web 41, the melted polyethylene binder layer 28a cools quickly. For instance, at bag film web speeds of 200 feet per minute, the melted polyethylene binder layer 28a drops below the melt temperature within 10 inches of the squeeze point between the lay on roller 43 and the lamination roller 44. This corresponds to about 0.25 seconds.

The lamination apparatus 40 and associated lamination methods provide advantages over prior approaches to attaching closure members to a plastic film web prior to forming reclosable plastic storage bags. For example, the lamination apparatus 40 and methods introduce less tension differences across the film web compared to "hot shoe" lamination methods where the film web and closure members are pulled between two hot shoes. In addition, the lamination apparatus 40 and methods result in more consistent film web tracking thereby improving consistency of the seal between the closure members 20, 30 and the film web 41.

Figure 5:
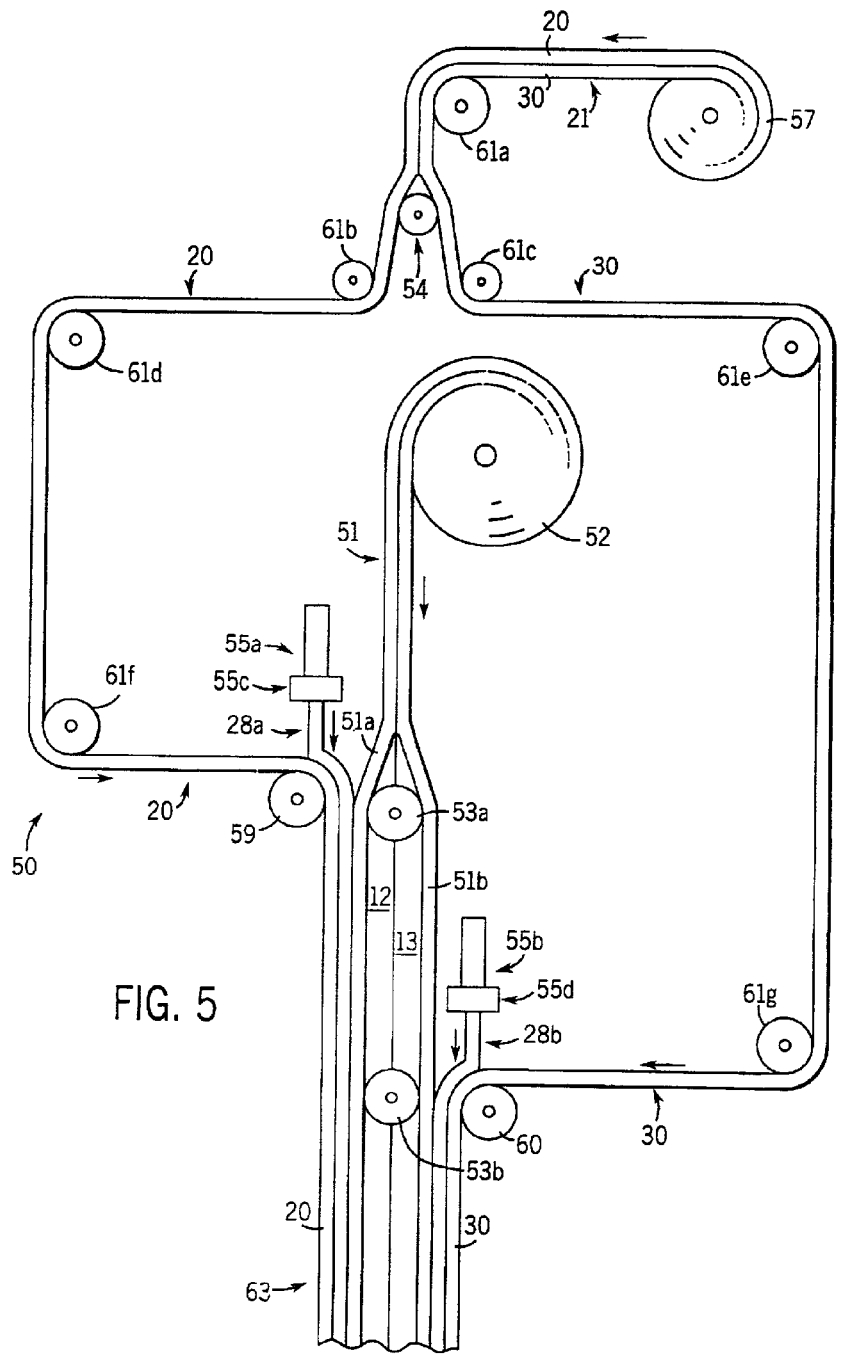
FIG. 5 is a side view of an alternative apparatus in accordance with the invention.

FIG. 5 shows an alternative lamination apparatus 50 to obtain a folded film 63 with a female closure strip 20 and a male closure strip 30 at opposite edges of a folded film web 51, the lamination apparatus 50 includes: a folded film supply roll 52 for supplying a folded film web 51 wound in a roll; a zipper supply roll 57 for supplying a zipper 21 comprising joined female closure strip 20 and male closure strip 30; a separation shift 54 for separating the female closure strip 20 and the male closure strip 30 after the zipper 21 is fed from the zipper supply roll 57; a binder layer extruder 55a with a die block 55c for supplying binder layer 28a; a binder layer extruder 55b with a die block 55d for supplying binder layer 28b; a female closure strip lamination roller 53a and a female closure strip lay on roller 59 for squeezing binder layer 28a between one edge 51a of the folded film web 51 and the inner surface 26 of the flange portion 24 of the female closure strip 20; and a male closure strip lamination roller 53b and a male closure strip lay on roller 60 for squeezing binder layer 28b between an opposite edge 51b of the folded film web 51 and the inner surface 36 of the flange portion 34 of the male closure strip 30.

The folded film web 51 is prefabricated using known techniques, such as extrusion and subsequent film folding, and is rolled up for storage on the folded film web supply roll 52. The female closure strip 20 and the male closure strip 30 are also prefabricated using known techniques such as extrusion and are joined and rolled up for storage on the zipper supply roll 57.

The folded film web 51 is then fed at a temperature that is below the melting temperature of the folded film web 51 (typically room temperature) from the folded film web supply roll 52 and at the same time, the zipper 21 is fed at a temperature that is below the melting temperature of the zipper 21 (typically room temperature) from the zipper supply roll 57. The zipper 21 is fed around stabilizing guide roller 61a into the separation shaft 54 to uncouple the female closure strip 20 and the male closure strip 30. After uncoupling, the female closure strip 20 and the male closure strip 30 are processed separately.

The female closure strip 20 wraps stabilizing guide rollers 61b, 61d and 61f and then wraps the female closure strip lay on roller 59. The binder layer extruder 55a is positioned in the lamination apparatus 50 such that binder layer 28a is placed on the inner surface 26 of the flange portion 24 of the female closure strip 20 just prior to the female closure strip 20 and the edge 51a of the folded film web 51 being squeezed between the female closure strip lay on roller 59 and the female closure strip lamination roller 53a, which also serves to open one end of the folded film web 51.

The binder layer 28a transfers enough heat to the inner surface 26 of the flange portion 24 of the female closure strip 20 and the edge 51a of the folded film web 51 to melt the flange portion 24 of the female closure strip 20 and the edge 51a of the folded film web 51. Pressure applied by the female closure strip lay on roller 59 and the female closure strip lamination roller 53a keeps the melted flange portion 24 of the female closure strip 20 in contact with the melted binder layer 28a and keeps the melted portion of the folded film web 51 in contact with the melted binder layer 28a at that point in the web path such that the female closure strip 20 is sealed to edge 51a of the folded film web 51 when the melted flange portion 24 of the female closure strip 20, the melted binder layer 28a and the melted portion of the folded film web 51 cool.

The male closure strip 30 wraps stabilizing guide rollers 61c, 61e, 61g and then wraps the male closure strip lay on roller 60. The binder layer extruder 55b is positioned in the lamination apparatus 50 such that binder layer 28b is placed on the inner surface 36 of the flange portion 34 of the male closure strip 30 just prior to the male closure strip 30 and the edge 51b of the folded film web 51 being squeezed between the male closure strip lay on roller 60 and the male closure strip lamination roller 53b. The binder layer 28b transfers enough heat to the inner surface 36 of the flange portion 34 of the male closure strip 30 and the edge 51b of the folded film web 51 to melt the flange portion 34 of the male closure strip 30 and the edge 51b of the folded film web 51.

Pressure applied by the male closure strip lay on roller 60 and the male closure strip lamination roller 53b keeps the melted flange portion 34 of the male closure strip 30 in contact with the melted binder layer 28b and keeps the melted portion of the folded film web 51 in contact with the melted binder layer 28b at that point in the web path such that the male closure strip 30 is sealed to edge 51b of the folded film web 51 when the melted flange portion 34 of the male closure strip 30, the melted binder layer 28b and the melted portion of the folded film web 51 cool. At folded film web speeds of 100 feet/minute, the lamination apparatus 50 produces a folded film 63 with good lamination of the female closure strip 20 and the male closure strip 30 to the folded film web 51 and with no tack of the film layers.

In the version of the lamination apparatus 50 shown in FIG. 5, the female closure strip 20 is sealed to the folded film web 51 before the male closure strip 30 is sealed to the folded film web 51. Of course, the lamination apparatus 50 also works well if configured such that the male closure strip 30 is sealed to the folded film web 51 before the female closure strip 20 is sealed to the folded film web 51. After processing in the lamination apparatus 50, the folded film web 51 exits as folded film 63 with female closure strip 20 and male closure strip 30 at opposite top edges and adjacent to each other. The side edges 15, 16 and the bottom edge 17 of the reclosable bag 10 shown in FIG. 1 may then be formed by heat sealing as is well known in the art.

Figure 6:
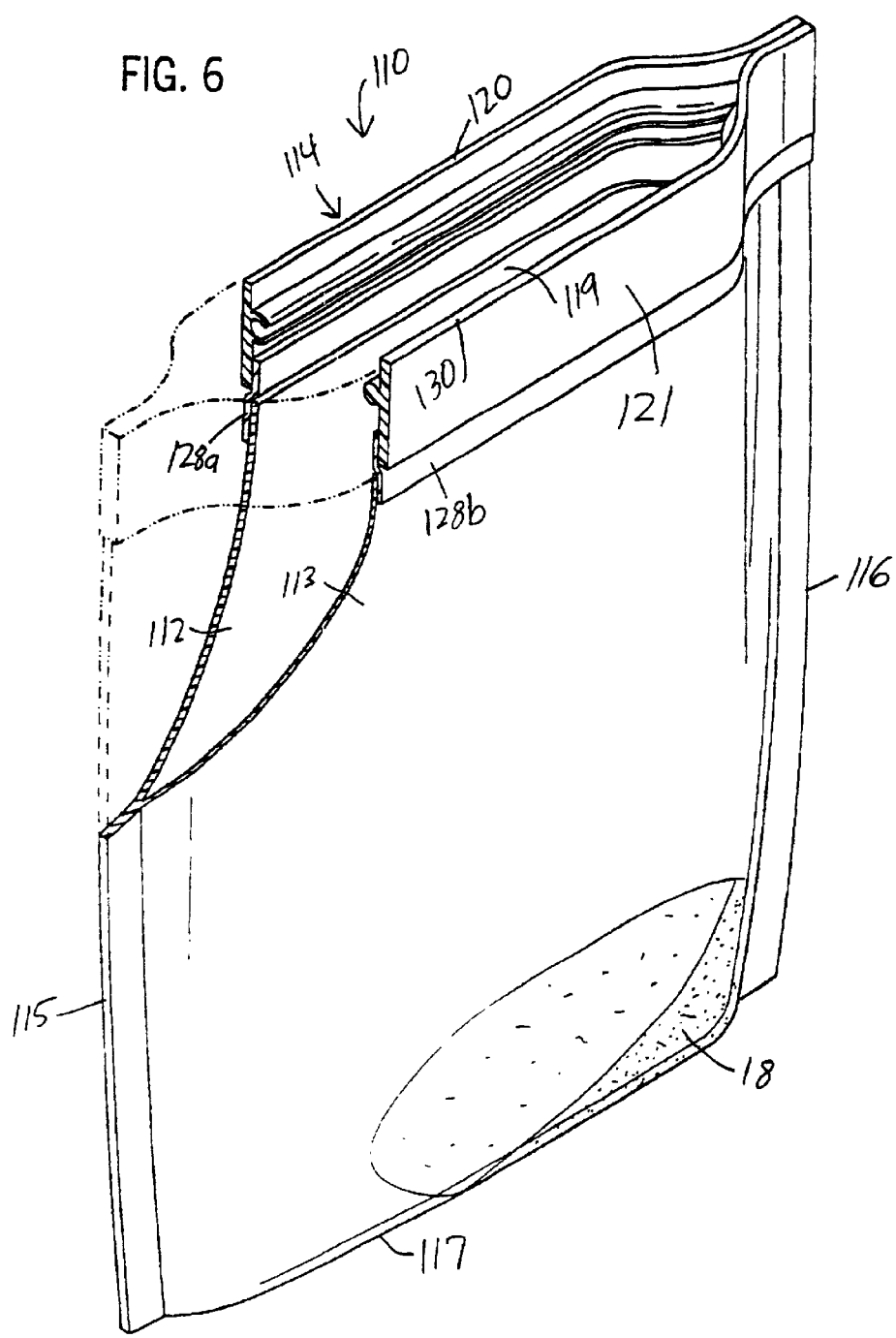
FIG. 6 is a perspective view of another reclosable plastic bag made in accordance with the present invention.
Figure 7:
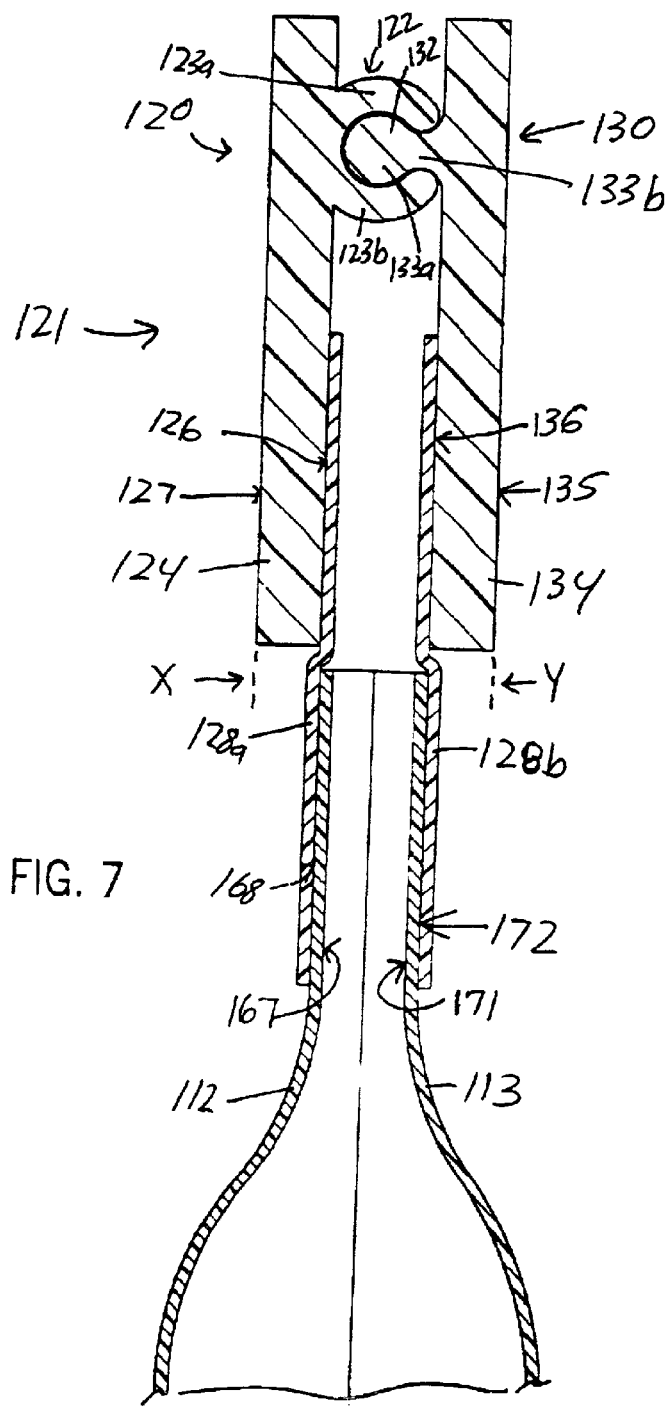
FIG. 7 is a partial cross sectional view of the closure arrangement of FIG. 6, albeit when the bag is closed.

Referring to FIGS. 6 and 7, there is shown another flexible bag 110 made of first and second opposed panel sections 112, 113 from a polymeric film. The sections are heat sealed together along a pair of side edges 115, 116, and a bottom edge 117 in order to form a pocket 119 within the interior of the bag 110. The pocket 119 may be used to hold a product 18, such as a variety of "left over" edible food substances, or non-edible products. Access to the interior of the bag 110 is provided through an opening 114.

Sections 112, 113 may be made of any thermoplastic resin capable of forming a flexible film. Specific thermoplastic resinous films are chosen to provide adequate tensile strength, tear strength, pressure resistance, impact strength, and the like, for the end use desired, at minimal cost for the selected use. Low or high density polyethylene, linear low density polyethylene, polypropylene, nylon, and interpolymers of ethylene and one or more monomers copolymerizable therewith are typically preferred. Suitable thicknesses generally fall within the range of 0.025 mm to 0.254 mm, preferably from about 0.038 mm to about 0.114 mm. The film can be formed from a single layer of thermoplastic resin or it may be formed as a multilayer structure.

Flexible bag 110 includes a zipper type closure 121 extending from side edge 115 to side edge 116. Female closure strip 120 includes an elongated inward profile 122 attached to or integrally formed with female closure strip 120, and the male closure strip 130 includes an elongated projecting profile 132 attached to or integrally formed with male closure strip 130. The inward profile 122 and the projecting profile 132 cooperate by snap interlocking to allow bag 110 to be opened and reclosed in the usual manner. As illustrated in FIG. 7, the projecting profile 132 has a cross section which is generally tree-shaped including an expanded head portion 133a and a narrower trunk portion 133b. The locking structure of the inward profile 122 includes first and second arcs 123a and 123b with a cross section which mechanically engage the head 133a of the male projecting profile 132 to reclose bag 110.

The female closure strip 120 also includes a flange portion 124, and the male closure strip 130 also includes a flange portion 134. The inner surface 126 of the flange portion 124 is configured for attachment to the panel 112 of the bag 110, and the inner surface 136 of the flange portion 134 is configured for attachment to the panel 113 of the bag 110. The zipper 121 is permanently attached to bag 110 by adhering the inner surface 126 of the flange portion 124 of the female closure strip 120 to the panel 112 via binder layer 128a, and adhering the inner surface 136 of the flange portion 134 of the male closure strip 130 to the panel 113 via binder layer 128b.

The female closure strip 120 and the male closure strip 130 of the zipper 121 can be made of any thermoplastic resin suitable for forming a reclosable bag zipper. Thermoplastic resins preferred for use in forming the zipper of the present invention include low or high density polyethylene, linear low density polyethylene, polypropylene, nylon, and interpolymers of ethylene and one or more monomers copolymerizable therewith. Suitable thicknesses for the flange portion 124 of the female closure strip 120 and for the flange portion 134 of the male closure strip 130 generally fall within the range of from about 0.076 mm to 0.305 mm, preferably from about 0.152 mm to 0.229 mm. Again, the female closure strip 120 and the male closure strip 130 can be formed from a single layer of thermoplastic resin or they may be formed as a multilayer structure having a plurality of layers.

The binder layer 128a and the binder layer 128b may comprise any thermoplastic resin suitable for bonding the male and female closure members and the film used to form the opposed panel sections 112, 113. Thermoplastic resins suitable for use in the binder layer 128a and the binder layer 128b of the present invention include low or high density polyethylene, linear low density polyethylene, polypropylene, nylon, and interpolymers of ethylene and one or more monomers copolymerizable therewith. Suitable thicknesses for the binder layers 128a/128b generally fall within the range of about 0.025 mm to about 0.152 mm, preferably from about 0.025 mm to 0.102 mm. The binder layers can be formed from a single layer of thermoplastic resin or may be formed as a multilayer structure having a plurality of layers. The width of the binder layer 128a and the binder layer 128b (as measured in a direction extending from the bottom edge 117 of the bag 110 toward the zipper 121) generally fall within the range of about 1.27 mm to 6.35 mm, preferably from about 3.175 mm to 4.445 mm.

Still referring to FIG. 7, it can be seen that the inner surface 126 of the flange portion 124 of the female closure strip 120 is bonded to binder layer 128a which is bonded to an outer surface 168 of the panel 112 such that the panel 112 is not in overlapping relationship (as defined above) with the female closure strip 120, and that the inner surface 136 of the flange portion 134 of the male closure strip 130 is bonded to binder layer 128b which is bonded to an outer surface 172 of the panel 113 such that the panel 113 is not in overlapping relationship (as defined above) with the male closure strip 130. Also, the binder layer 128a includes a bent inner section 169 such that the distance from an interior surface 167 of panel 112 adjacent the opening 114 to an imaginary line "X" that coplanar with an exterior surface 125 of the female closure strip 120 is less than a total thickness of the panel 112, the female closure strip 120 and the binder layer 128a combined. Likewise, the binder layer 128b includes a bent inner section 173 such that the distance from an interior surface 171 of panel 113 adjacent the opening 114 to an imaginary line "Y" that coplanar with an exterior surface 135 of the male closure strip 130 is less than a total thickness of the panel 113, the male closure strip 130 and the binder layer 128b combined. In effect, the binding layer 128a becomes part of the structure of the bag 110 and the amount of material that makes up the flange 124 of the female closure strip 120, the binding layer 128a and the panel 112 is greatly reduced thereby improving sealability. Likewise, the binding layer 128b becomes part of the structure of the bag 110 and the amount of material that makes up the flange 134 of the male closure strip 130, the binding layer 128b and the panel 113 is greatly reduced thereby improving sealability.

The apparatus of FIGS. 3 and 4 may be used to manufacture a bag film with closure members (one half of a zipper) on its opposed ends that is suitable for forming the reclosable bag 110 as in FIGS. 6 and 7. The bag film with closure members can be made from prefabricated bag film web 41, prefabricated female closure strip 120, and prefabricated male closure strip 130. The bag film web 41 is fed from the bag film supply roll 42 at a temperature that is below the melting temperature of the film web 41 (typically room temperature) and then wraps on the lamination roller 44 to stabilize the bag film web 41. At the same time, the female closure strip 120 is fed from the female closure strip supply roll 47a at a temperature that is below the melting temperature of the female closure strip 120 (preferably room temperature) and the male closure strip 130 is fed from the male closure strip supply roll 47b at a temperature that is below the melting temperature of the male closure strip 130 (preferably room temperature). The female closure strip 120 and the male closure strip 130 then wrap opposite ends of the lay-on roller 43.

In an alternate version of the apparatus, the bag film web 41 may be fed directly from an extruder after cooling to a temperature that is below the melting temperature of the film web 41 (typically room temperature) and then wrapped on the lamination roller 44 to stabilize the bag film web 41. At the same time, the female closure strip 120 may be fed directly from an extruder after cooling to a temperature that is below the melting temperature of the female closure strip 120 (preferably room temperature) and the male closure strip 130 may be fed directly from an extruder after cooling to a temperature that is below the melting temperature of the male closure strip 30 (preferably room temperature). The female closure strip 120 and the male closure strip 130 then wrap opposite ends of the lay-on roller 43.

The bag film web 41 is wrapped on the lamination roller 44 and the female closure strip 120 and the male closure strip 130 are wrapped on opposite ends of the lay-on roller 43 such that the film web 41 and the female closure strip 120 are not in overlapping relationship (as defined above) when fed through a pinch area between the lamination roller 44 and the lay-on roller 43 and such that the film web 41 and the male closure strip 130 are not in overlapping relationship (as defined above) when fed through the pinch area between the lamination roller 44 and the lay-on roller 43. The flange portion 124 of the female closure strip 120 and the bag film web 41 may be in end-to-end abutting relationship and the flange portion 134 of the male closure strip 130 and the bag film web 41 may be in end-to-end abutting relationship when the bag film web 41 and the female closure strip 120 and the male closure strip 130 are fed through the pinch area between the lamination roller 44 and the lay-on roller 43. A gap may also be formed between the female closure strip 120 and the bag film web 41 and a gap may also be formed between the male closure strip 130 and the bag film web 41 when the female closure strip 120 and the male closure strip 130 and the bag film web 41 are fed through the pinch area between the lamination roller 44 and the lay-on roller 43.

The binder layer extruders 45a and 45b are positioned in the apparatus 40 such that binder layers 128a and 128b are placed on the inner surface 126 of the flange portion 124 of the female closure strip 120 and the inner surface 136 of the flange portion 134 of the male closure strip 130 respectively just prior to the female closure strip 120 and the bag film web 41 being fed through the pinch area between the lamination roller 44 and the lay-on roller 43 and just prior to the male closure strip 130 and the bag film web 41 being fed through the pinch area between the lamination roller 44 and the lay-on roller 43. During operation of the binder layer extruders 45a and 45b, the draw-down of the binder layers 128a and 128b is about 11.5 cm from a 1.9 cm width die. The temperature of the binder layers 128a and 128b at the die blocks 45c and 45d is typically about 127° C. The binder layers 128a and 128b transfer enough heat to the flange portion 124 of the female closure strip 120 and the flange portion 134 of the male closure strip 130 respectively to melt a surface of flange portion 124 of the female closure strip 120 and a surface of flange portion 134 of the male closure strip 130. The binder layers 128a and 128b also transfer enough heat to the edges of the bag film web 41 to melt the edges of the bag film web 41.

The pressure applied by the lay-on roller 43 and the lamination roller 44 keeps the melted flange portion 124 of the female closure strip 120 in contact with the melted binder layer 128a and keeps the melted portion of the bag film web 41 in contact with the melted binder layer 128a at that point in the web path such that the female closure strip 120 is sealed to one longitudinal edge of the melted binder layer 128a and the base film web 41 is sealed to another longitudinal edge of the melted binder layer 128a when the melted flange portion 124 of the female closure strip 120, the melted binder layer 128a and the melted portion of the bag film web 41 cool. Likewise, the pressure applied by the lay-on roller 43 and the lamination roller 44 keeps the melted flange portion 134 of the male closure strip 130 in contact with the melted binder layer 128b and keeps the melted portion of the bag film web 41 in contact with the melted binder layer 128b at that point in the web path such that the male closure strip 130 is sealed to one longitudinal edge of the melted binder layer 128b and the base film web 41 is sealed to another longitudinal edge of the melted binder layer 128b when the melted flange portion 134 of the male closure strip 130, the melted binder layer 128b and the melted portion of the bag film web 41 cool. Preferably, the lay-on roller 43 and the lamination roller 44 are coated with polytetrafluoroethylene or a polytetrafluoroethylene tape in order to more efficiently press together without sticking the melted flange portion 124 of the female closure strip 120, the melted binder layer 128a and the melted portion of the bag film web 41, and press together without sticking the melted flange portion 134 of the male closure strip 130, the melted binder layer 128b and the melted portion of the bag film web 41.

For example, the apparatus 40 can seal a polyethylene female closure strip 120 having a flange portion 124 with a thickness of about 0.190 mm to a polyethylene bag film web 41 having a thickness of about 0.076 mm with a polyethylene binder layer 128a having a thickness of about 0.063 mm and a width (as measured in a direction extending from the bottom edge 117 of the bag 110 toward the zipper 121) of about 3.81 mm. Because the dimensions of the polyethylene binder layer 128a are small compared to the dimensions of the flange portion 124 of the female closure strip 120 and the dimensions of the melted portion of the bag film web 41, the melted polyethylene binder layer 128a cools quickly. For instance, at bag film web speeds of 200 feet per minute, the melted polyethylene binder layer 128a drops below the melt temperature within 10 inches of the squeeze point between the lay on roller 43 and the lamination roller 44. This corresponds to about 0.25 seconds.

Figure 8:
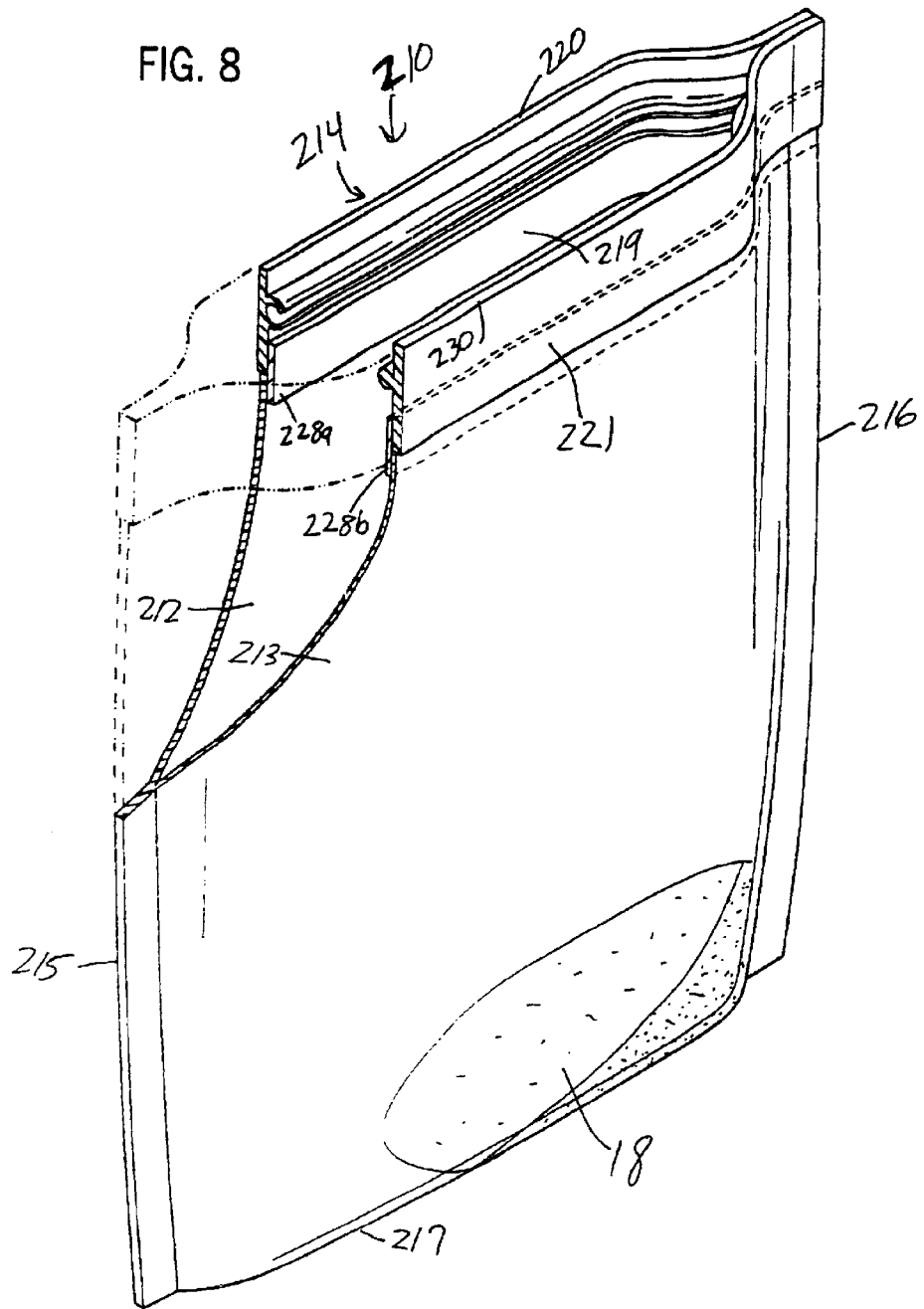
FIG. 8 is a perspective view of yet another reclosable plastic bag made in accordance with the present invention.
Figure 9:
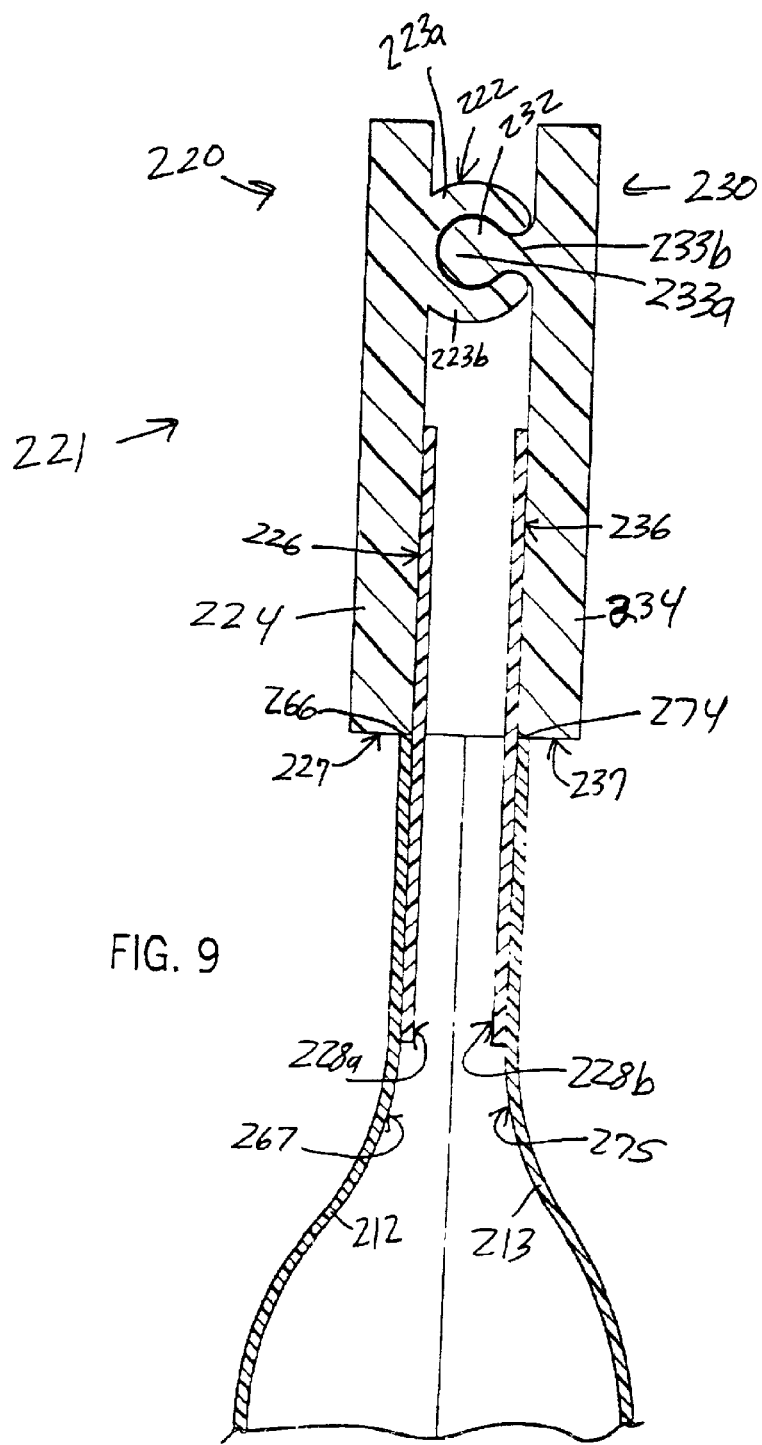
FIG. 9 is a partial cross sectional view of the closure arrangement of FIG. 8, albeit when the bag is closed.

Referring to FIGS. 8 and 9, there is shown yet another flexible bag 210 made of first and second opposed panel sections 212, 213 from a polymeric film. The sections are heat sealed together along a pair of side edges 215, 216, and a bottom edge 217 in order to form a pocket 219 within the interior of the bag 210. The pocket 219 may be used to hold a product 18, such as a variety of "left over" edible food substances, or non-edible products. Access to the interior of the bag 210 is provided through an opening 214.

Sections 212, 213 may be made of any thermoplastic resin capable of forming a flexible film. Specific thermoplastic resinous films are chosen to provide adequate tensile strength, tear strength, pressure resistance, impact strength, and the like, for the end use desired, at minimal cost for the selected use. Low or high density polyethylene, linear low density polyethylene, polypropylene, nylon, and interpolymers of ethylene and one or more monomers copolymerizable therewith are typically preferred. Suitable thicknesses generally fall within the range of 0.025 mm to 0.254 mm, preferably from about 0.038 mm to about 0.114 mm. The film can be formed from a single layer of thermoplastic resin or it may be formed as a multilayer structure.

Flexible bag 210 includes a zipper type closure 221 extending from side edge 215 to side edge 216. Female closure strip 220 includes an elongated inward profile 222 attached to or integrally formed with female closure strip 220, and the male closure strip 230 includes an elongated projecting profile 232 attached to or integrally formed with male closure strip 230. The inward profile 222 and the projecting profile 232 cooperate by snap interlocking to allow bag 210 to be opened and reclosed in the usual manner. As illustrated in FIG. 9, the projecting profile 232 has a cross section which is generally tree-shaped including an expanded head portion 233a and a narrower trunk portion 233b. The locking structure of the inward profile 222 includes first and second arcs 223a and 223b with a cross section which mechanically engage the head 233a of the male projecting profile 232 to reclose bag 210.

The female closure strip 220 also includes a flange portion 224, and the male closure strip 230 also includes a flange portion 234. The inner surface 226 of the flange portion 224 is configured for attachment to the panel 212 of the bag 210, and the inner surface 236 of the flange portion 234 is configured for attachment to the panel 213 of the bag 210. The zipper 221 is permanently attached to bag 210 by adhering the inner surface 226 of the flange portion 224 of the female closure strip 220 to the panel 212 via binder layer 228a, and adhering the inner surface 236 of the flange portion 234 of the male closure strip 230 to the panel 213 via binder layer 228b.

The female closure strip 220 and the male closure strip 230 of the zipper 221 can be made of any thermoplastic resin suitable for forming a reclosable bag zipper. Thermoplastic resins preferred for use in forming the zipper of the present invention include low or high density polyethylene, linear low density polyethylene, polypropylene, nylon, and interpolymers of ethylene and one or more monomers copolymerizable therewith. Suitable thicknesses for the flange portion 224 of the female closure strip 220 and for the flange portion 234 of the male closure strip 230 generally fall within the range of from about 0.076 mm to 0.305 mm, preferably from about 0.152 mm to 0.229 mm. Again, the female closure strip 220 and the male closure strip 230 can be formed from a single layer of thermoplastic resin or they may be formed as a multilayer structure having a plurality of layers.

The binder layer 228a and the binder layer 228b may comprise any thermoplastic resin suitable for bonding the male and female closure members and the film used to form the opposed panel sections 212, 213. Thermoplastic resins suitable for use in the binder layer 228a and the binder layer 228b of the present invention include low or high density polyethylene, linear low density polyethylene, polypropylene, nylon, and interpolymers of ethylene and one or more monomers copolymerizable therewith. Suitable thicknesses for the binder layers 228a/228b generally fall within the range of about 0.025 mm to about 0.152 mm, preferably from about 0.025 mm to 0.102 mm. The binder layers can be formed from a single layer of thermoplastic resin or may be formed as a multilayer structure having a plurality of layers. The width of the binder layer 228a and the binder layer 228b (as measured in a direction extending from the bottom edge 217 of the bag 210 toward the zipper 221) generally fall within the range of about 1.27 mm to 6.35 mm, preferably from about 3.175 mm to 4.445 mm.

Still referring to FIG. 9, it can be seen that the inner surface 226 of the flange portion 224 of the female closure strip 220 is bonded to binder layer 228a which is bonded to an interior surface 267 of panel 212 such that the panel 212 is not in overlapping relationship (as defined above) with the female closure strip 220. Likewise, the inner surface 236 of the flange portion 234 of the male closure strip 230 is bonded to binder layer 228b which is bonded to an interior surface 275 of panel 213 such that the panel 213 is not in overlapping relationship (as defined above) with the male closure strip 230. In one form, an end 227 of the female closure strip 220 and an end 266 of the panel 212 are in abutting relationship, and an end 237 of the male closure strip 230 and an end 274 of the panel 213 are in abutting relationship.

Figure 10:
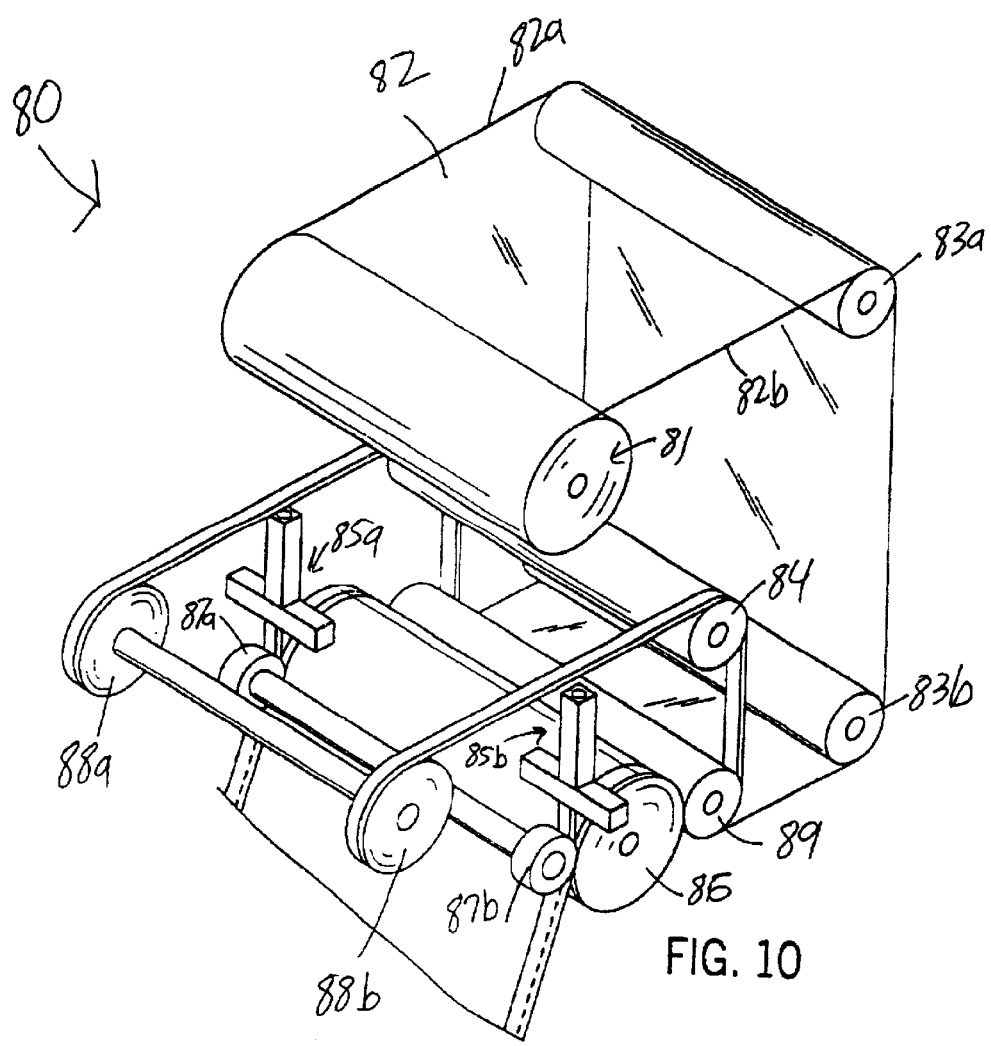
FIG. 10 is a perspective view of another alternative apparatus in accordance with the invention.

FIG. 10 shows an apparatus that may be used to manufacture a bag film with closure members (one half of a zipper) on its opposed ends. The bag film can then be folded to bring the zipper halves adjacent to each other and heat sealed along the side edges to form a reclosable bag 210 as in FIGS. 8 and 9. Lamination apparatus 80 includes a bag film supply roll 81 for supplying a bag film web 82 wound into a roll, a female closure strip supply roll 88a for supplying the female closure strip 220, a male closure strip supply roll 88b for supplying the male closure strip 230, a binder layer extruder 85a for supplying the binder layer 228a, a binder layer extruder 85b for supplying binder layer 228b, a lamination roller 86, a lay-on roller 87a which cooperates with the lamination roller 86 to press binder layer 228a against one edge of bag film web 82 and against the inner surface 226 of the flange portion 224 of the female closure strip 220, and a lay-on roller 87b which cooperates with the lamination roller 86 to press binder layer 228b against the opposite edge of bag film web 82 and against the inner surface 236 of the flange portion 234 of the male closure strip 230.

The binder layer extruders 85a and 85b may include a hopper (not shown) for receiving plastic material, a body (not shown) which contains a heating means for heating the plastic material into a molten state, and a screw auger (not shown) for advancing the molten plastic material to and through die blocks. The die blocks include a die slot (not shown) configured such that the binder layers 228a and 228b extruded from the extruders 85a and 85b have a cross-sectional shape similar to the cross-sectional shape of the die slot.

The bag film web 82 is prefabricated using known techniques such as extrusion and is rolled up for storage on the bag film supply roll 81. The female closure strip 220 is also prefabricated using known techniques such as extrusion and is rolled up for storage on the female closure strip supply roll 88a. The male closure strip 230 is likewise prefabricated using known techniques such as extrusion and is rolled up for storage on the male closure strip supply roll 88b. The bag film web 82 is fed from the bag film supply roll 81 at a temperature that is below the melting temperature of the film web 82 (typically room temperature) and then wraps on web stabilizing rollers 83a and 83b to stabilize the bag film web 82.

At the same time, the female closure strip 220 is fed from the female closure strip supply roll 88a at a temperature that is below the melting temperature of the female closure strip 220 (preferably room temperature), and the male closure strip 230 is fed from the male closure strip supply roll 88b at a temperature that is below the melting temperature of the male closure strip 230 (preferably room temperature). The female closure strip 220 wraps on one end of closure strip stabilizing roller 84 to stabilize the female closure strip 220, and the male closure strip 230 also wraps on an opposite end of closure strip stabilizing roller 84 to stabilize the male closure strip 230.

In an alternate version of the apparatus 80, the bag film web 82 may be fed directly from an extruder after cooling to a temperature that is below the melting temperature of the film web 82 (typically room temperature) and then wrapped on the web stabilizing rollers 83a and 83b to stabilize the bag film web 82. At the same time, the female closure strip 220 may be fed directly from an extruder after cooling to a temperature that is below the melting temperature of the female closure strip 220 (preferably room temperature) and the male closure strip 230 may be fed directly from an extruder after cooling to a temperature that is below the melting temperature of the male closure strip 230 (preferably room temperature). The female closure strip 220 and the male closure strip 230 then wrap opposite ends of the closure strip stabilizing roller 84.

The bag film web 82, the female closure strip 220, and the male closure strip 230 then all wrap on web and closure strip stabilizing roller 89. The female closure strip 220 and the male closure strip 230 wrap on opposite ends of the web and closure strip stabilizing roller 89, and the bag film web 82 wraps on the web and closure strip stabilizing roller 89 between the female closure strip 220 and the male closure strip 230. Preferably, the female closure strip 220 and the bag film web 82 do not overlap (as defined above) when the bag film web 82 and the female closure strip 220 are wrapped on the web and closure strip stabilizing roller 89, and the end 227 of the female closure strip 220 and an end 82a of the bag film web 82 may be in abutting relationship when the bag film web 82 and the female closure strip 220 are wrapped on the web and closure strip stabilizing roller 89. A gap may also be formed between the female closure strip 220 and the bag film web 82 when the bag film web 82 and the female closure strip 220 are wrapped on the web and closure strip stabilizing roller 89. Likewise, the male closure strip 230 and the bag film web 82 do not overlap (as defined above) when the bag film web 82 and the male closure strip 230 are wrapped on the web and closure strip stabilizing roller 89, and the end 237 of the male closure strip 230 and an end 82b of the bag film web 82 may be in abutting relationship when the bag film web 82 and the male closure strip 230 are wrapped on the web and closure strip stabilizing roller 89. A gap may also be formed between the male closure strip 230 and the bag film web 82 when the bag film web 82 and the male closure strip 230 are wrapped on the web and closure strip stabilizing roller 89.

The binder layer extruder 85a is positioned in the lamination apparatus 80 such that binder layer 228a is placed on the inner surface 226 of the flange portion 224 of the female closure strip 220 and on a surface of the bag film web 82 near the end 82a of the bag film web 82 just prior to the binder layer 228a being pressed against the inner surface 226 of the flange portion 224 of the female closure strip 220 and the bag film web 82 by lay on roller 87a. Likewise, the binder layer extruder 85b is positioned in the lamination apparatus 80 such that binder layer 228b is placed on the inner surface 236 of the flange portion 234 of the male closure strip 230 and on a surface of the bag film web 82 near the end 82b of the bag film web 82 just prior to the binder layer 228b being pressed against the inner surface 236 of the flange portion 234 of the male closure strip 230 and the bag film web 82 by lay on roller 87b. During operation of the binder layer extruders 85a and 85b, the draw-down of the binder layers 228a and 228b is about 11.5 cm from a 1.9 cm width die.

The temperature of the binder layers 228a and 228b at the die blocks of the binder layer extruders 85a and 85b is typically about 127° C. The binder layers 228a and 228b transfer enough heat to the flange portion 224 of the female closure strip 220 and the flange portion 234 of the male closure strip 230 respectively to melt a surface of flange portion 224 of the female closure strip 220 and a surface of flange portion 234 of the male closure strip 230. The binder layers 228a and 228b also transfer enough heat to the edges of the bag film web 82 to melt the edges of the bag film web 82.

It is particularly important that the binder layer thickness and width be sufficiently great so as to carry enough heat to create a melting surface adjacent the binding layers 228a and 228b. At the same time, the binding layers 228a and 228b must be sufficiently thin so as to create a stable cooled structure in a short period of time (typically under one second after the binding layers 228a and 228b contact the edges of the bag film web 82). Likewise, the die blocks of the binder layer extruders 85a and 85b must be located sufficiently near the female closure strip 220, the male closure strip 230, and the edges of the bag film web 82 so that the binder layers 228a and 228b retain enough heat after moving away from the die blocks of the binder layer extruders 85a and 85b such that the binder layers 228a and 228b melt the female closure strip 220, the male closure strip 230, and the edges of the bag film web 82.

The pressure applied by the lay-on roller 87a and the lamination roller 86 keeps the melted flange portion 224 of the female closure strip 220 in contact with the melted binder layer 228a and keeps the melted portion of the bag film web 82 in contact with the melted binder layer 228a at that point in the web path such that the female closure strip 220 is sealed to the binder layer 228a and the edge of the bag film web 82 is sealed to the binder layer 228a when the melted flange portion 224 of the female closure strip 220, the melted binder layer 228a and the melted portion of the bag film web 82 cool. Likewise, the pressure applied by the lay-on roller 87b and the lamination roller 86 keeps the melted flange portion 234 of the male closure strip 230 in contact with the melted binder layer 228b and keeps the melted portion of the bag film web 82 in contact with the melted binder layer 228b at that point in the web path such that the male closure strip 230 is sealed to the binder layer 228b and the edge of the base film web 82 is sealed to the binder layer 228b when the melted flange portion 234 of the male closure strip 230, the melted binder layer 228b and the melted portion of the bag film web 82 cool. Preferably, the lay-on rollers 87a, 87b are coated with polytetrafluoroethylene or a polytetrafluoroethylene tape in order to press together without sticking the melted flange portion 224 of the female closure strip 220, the melted binder layer 228a and the melted portion of the bag film web 82 and press together without sticking the melted flange portion 234 of the male closure strip 230, the melted binder layer 228b and the melted portion of the bag film web 82.

For example, the apparatus 80 can seal a polyethylene female closure strip 220 having a flange portion 224 with a thickness of about 0.190 mm to a polyethylene bag film web 82 having a thickness of about 0.076 mm with a polyethylene binder layer 228a having a thickness of about 0.063 mm and a width (as measured in a direction extending from the bottom edge 217 of the bag 210 toward the zipper 221) of about 3.81 mm. Because the dimensions of the polyethylene binder layer 228a are small compared to the dimensions of the flange portion 224 of the female closure strip 220 and the dimensions of the melted portion of the bag film web 82, the melted polyethylene binder layer 228a cools quickly. For instance, at bag film web speeds of 200 feet per minute, the melted polyethylene binder layer 228a drops below the melt temperature within 10 inches of the squeeze point between the lay on roller 87a and the lamination roller 86. This corresponds to about 0.25 seconds.

The lamination apparatus 80 and associated lamination methods provide advantages over prior approaches to attaching closure members to a plastic film web prior to forming reclosable plastic storage bags. For example, the lamination apparatus 80 and methods introduce less tension differences across the film web compared to "hot shoe" lamination methods where the film web and closure members are pulled between two hot shoes. In addition, the lamination apparatus 80 and methods result in more consistent film web tracking thereby improving consistency of the seal between the closure members 220, 230 and the film web 82.

Figure 11:
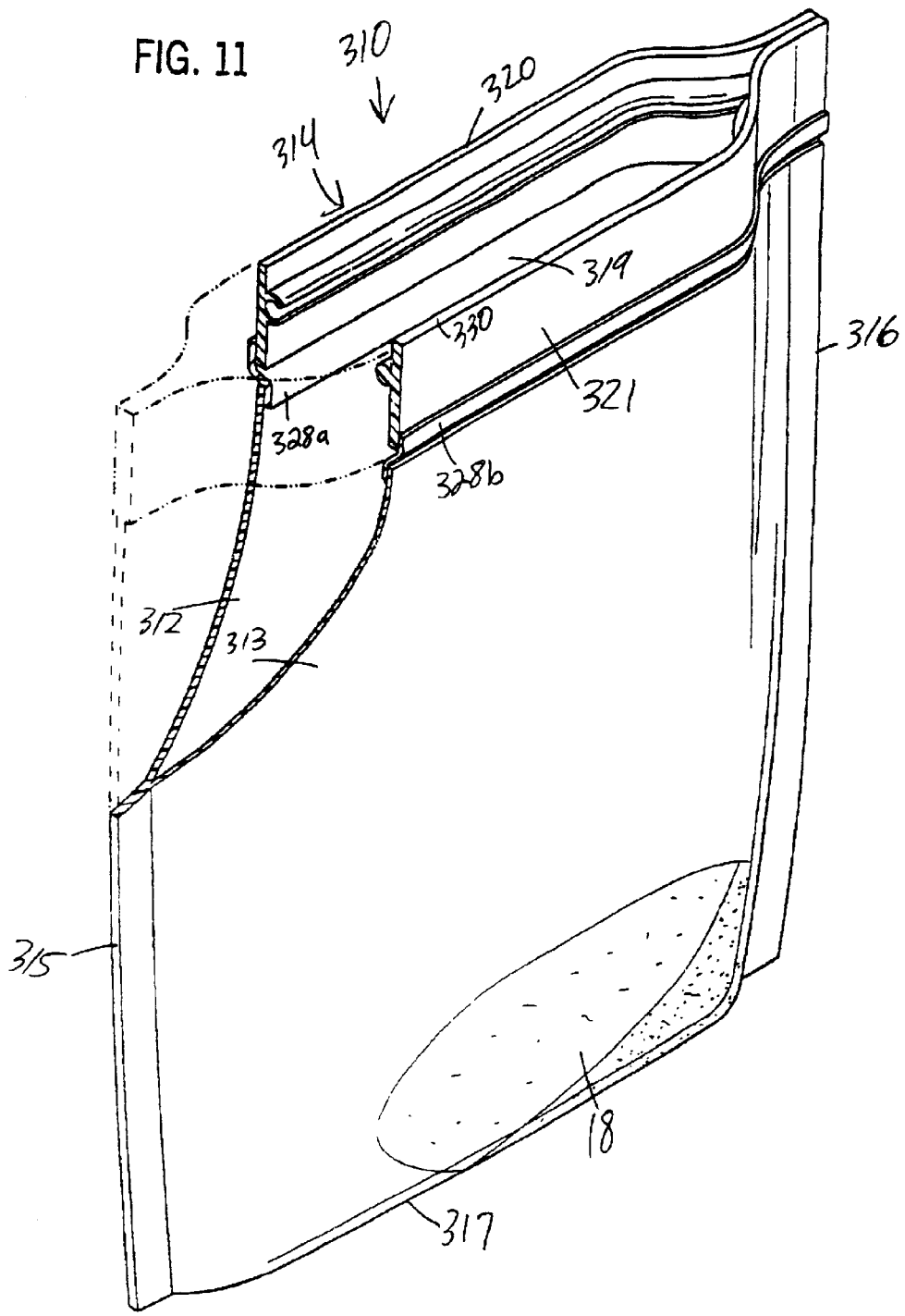
FIG. 11 is a perspective view of still another reclosable plastic bag made in accordance with the present invention.
Figure 12:
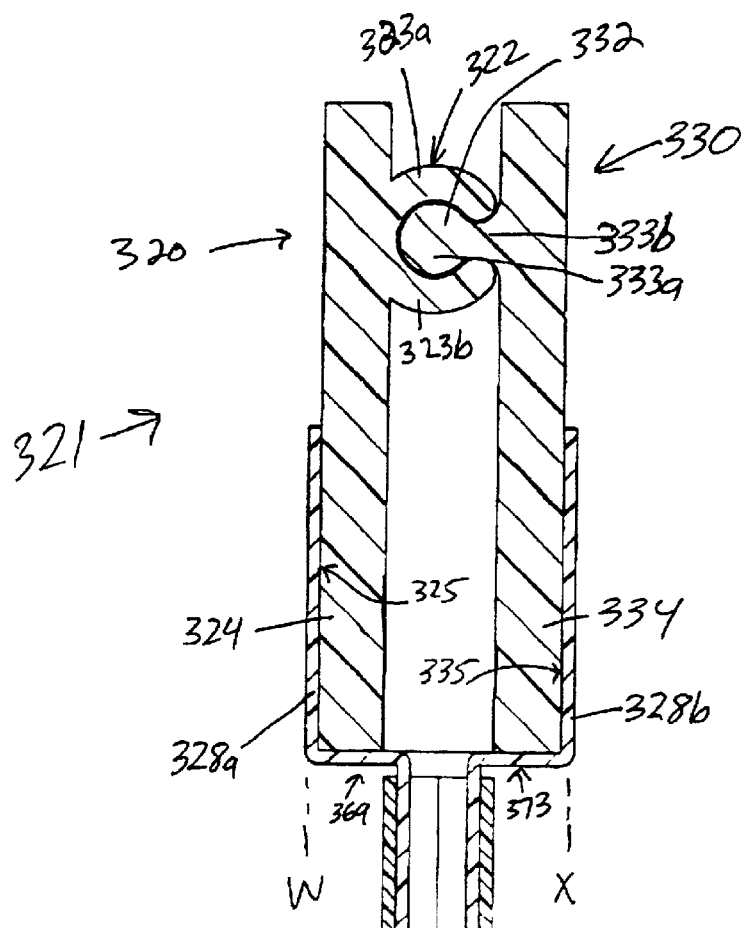
FIG. 12 is a partial cross sectional view of the closure arrangement of FIG. 11, albeit when the bag is closed.

Referring to FIGS. 11 and 12, there is shown still another flexible bag 310 made of first and second opposed panel sections 312, 313 from a polymeric film. The sections are heat sealed together along a pair of side edges 315, 316, and a bottom edge 317 in order to form a pocket 319 within the interior of the bag 310. The pocket 319 may be used to hold a product 18, such as a variety of "left over" edible food substances, or non-edible products. Access to the interior of the bag 310 is provided through an opening 314.

Sections 312, 313 may be made of any thermoplastic resin capable of forming a flexible film. Specific thermoplastic resinous films are chosen to provide adequate tensile strength, tear strength, pressure resistance, impact strength, and the like, for the end use desired, at minimal cost for the selected use. Low or high density polyethylene, linear low density polyethylene, polypropylene, nylon, and interpolymers of ethylene and one or more monomers copolymerizable therewith are typically preferred. Suitable thicknesses generally fall within the range of 0.025 mm to 0.254 mm, preferably from about 0.038 mm to about 0.114 mm. The film can be formed from a single layer of thermoplastic resin or it may be formed as a multilayer structure.

Flexible bag 310 includes a zipper type closure 321 extending from side edge 315 to side edge 316. Female closure strip 320 includes an elongated inward profile 322 attached to or integrally formed with female closure strip 320, and the male closure strip 330 includes an elongated projecting profile 332 attached to or integrally formed with male closure strip 330. The inward profile 322 and the projecting profile 332 cooperate by snap interlocking to allow bag 310 to be opened and reclosed in the usual manner. As illustrated in FIG. 12, the projecting profile 332 has a cross section which is generally tree-shaped including an expanded head portion 333a and a narrower trunk portion 333b. The locking structure of the inward profile 322 includes first and second arcs 323a and 323b with a cross section which mechanically engage the head 333a of the male projecting profile 332 to reclose bag 310.

The female closure strip 320 also includes a flange portion 324, and the male closure strip 330 also includes a flange portion 334. The outer surface 325 of the flange portion 324 is configured for attachment to the panel 312 of the bag 310, and the outer surface 335 of the flange portion 334 is configured for attachment to the panel 313 of the bag 310. The zipper 321 is permanently attached to bag 310 by adhering the outer surface 325 of the flange portion 324 of the female closure strip 320 to the panel 312 via binder layer 328a, and adhering the outer surface 335 of the flange portion 334 of the male closure strip 330 to the panel 313 via binder layer 328b.

The female closure strip 320 and the male closure strip 330 of the zipper 321 can be made of any thermoplastic resin suitable for forming a reclosable bag zipper. Thermoplastic resins preferred for use in forming the zipper of the present invention include low or high density polyethylene, linear low density polyethylene, polypropylene, nylon, and interpolymers of ethylene and one or more monomers copolymerizable therewith. Suitable thicknesses for the flange portion 324 of the female closure strip 320 and for the flange portion 334 of the male closure strip 330 generally fall within the range of from about 0.076 mm to 0.305 mm, preferably from about 0.152 mm to 0.229 mm. Again, the female closure strip 320 and the male closure strip 330 can be formed from a single layer of thermoplastic resin or they may be formed as a multilayer structure having a plurality of layers.

The binder layer 328a and the binder layer 328b may comprise any thermoplastic resin suitable for bonding the male and female closure members and the film used to form the opposed panel sections 312, 313. Thermoplastic resins suitable for use in the binder layer 328a and the binder layer 328b of the present invention include low or high density polyethylene, linear low density polyethylene, polypropylene, nylon, and interpolymers of ethylene and one or more monomers copolymerizable therewith. Suitable thicknesses for the binder layers 328a/328b generally fall within the range of about 0.025 mm to about 0.152 mm, preferably from about 0.025 mm to 0.102 mm. The binder layers can be formed from a single layer of thermoplastic resin or may be formed as a multilayer structure having a plurality of layers. The width of the binder layer 328a and the binder layer 328b (as measured in a direction extending from the bottom edge 317 of the bag 310 toward the zipper 321) generally fall within the range of about 1.27 mm to 6.35 mm, preferably from about 3.175 mm to 4.445 mm.

Still referring to FIG. 12, it can be seen that the outer surface 325 of the flange portion 324 of the female closure strip 320 is bonded to binder layer 328a which is bonded to an interior surface 368 of the panel 312 such that the panel 312 is not in overlapping relationship (as defined above) with the female closure strip 320, and that the outer surface 335 of the flange portion 334 of the male closure strip 330 is bonded to binder layer 328b which is bonded to an interior surface 371 of the panel 313 such that the panel 313 is not in overlapping relationship (as defined above) with the male closure strip 330. Also, the binder layer 328a includes a bent inner section 369 such that the distance from an exterior surface 367 of panel 312 adjacent the opening 314 to an imaginary line "W" that coplanar with the inner surface 326 of the female closure strip 320 is less than a total thickness of the panel 312, the female closure strip 320 and the binder layer 328a combined. Likewise, the binder layer 328b includes a bent inner section 373 such that the distance from an exterior surface 372 of panel 313 adjacent the opening 314 to an imaginary line "X" that coplanar with the interior surface 336 of the male closure strip 330 is less than a total thickness of the panel 313, the male closure strip 330 and the binder layer 328b combined. In effect, the binding layer 328a becomes part of the structure of the bag 310 and the amount of material that makes up the flange 324 of the female closure strip 320, the binding layer 328a and the panel 312 is greatly reduced thereby improving sealability. Likewise, the binding layer 328b becomes part of the structure of the bag 310 and the amount of material that makes up the flange 334 of the male closure strip 330, the binding layer 328b and the panel 313 is greatly reduced thereby improving sealability.

The apparatus of FIGS. 3 and 4 may be used to manufacture a bag film with closure members (one half of a zipper) on its opposed ends suitable for forming the reclosable bag 310 as in FIGS. 11 and 12. The methods are the same as for forming the reclosable bag 210 as in FIGS. 6 and 7, except that the female closure strip 320 is fed from the closure strip supply roll 47b with the profile 322 facing downward and the male closure strip 330 is fed from the closure strip supply roll 47a with the profile 332 facing downward.

Figure 13:
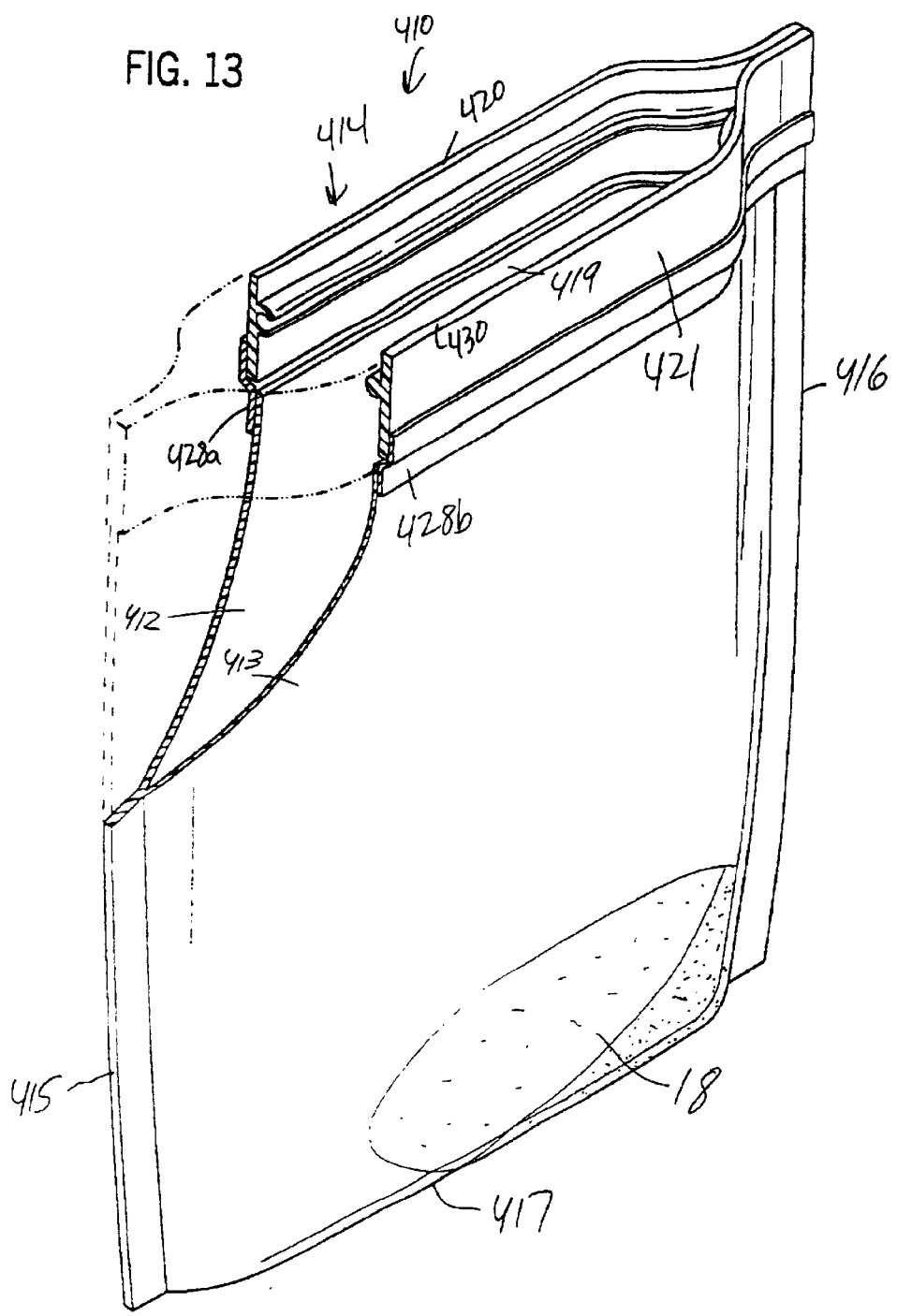
FIG. 13 is a perspective view of yet another reclosable plastic bag made in accordance with the present invention.
Figure 14:
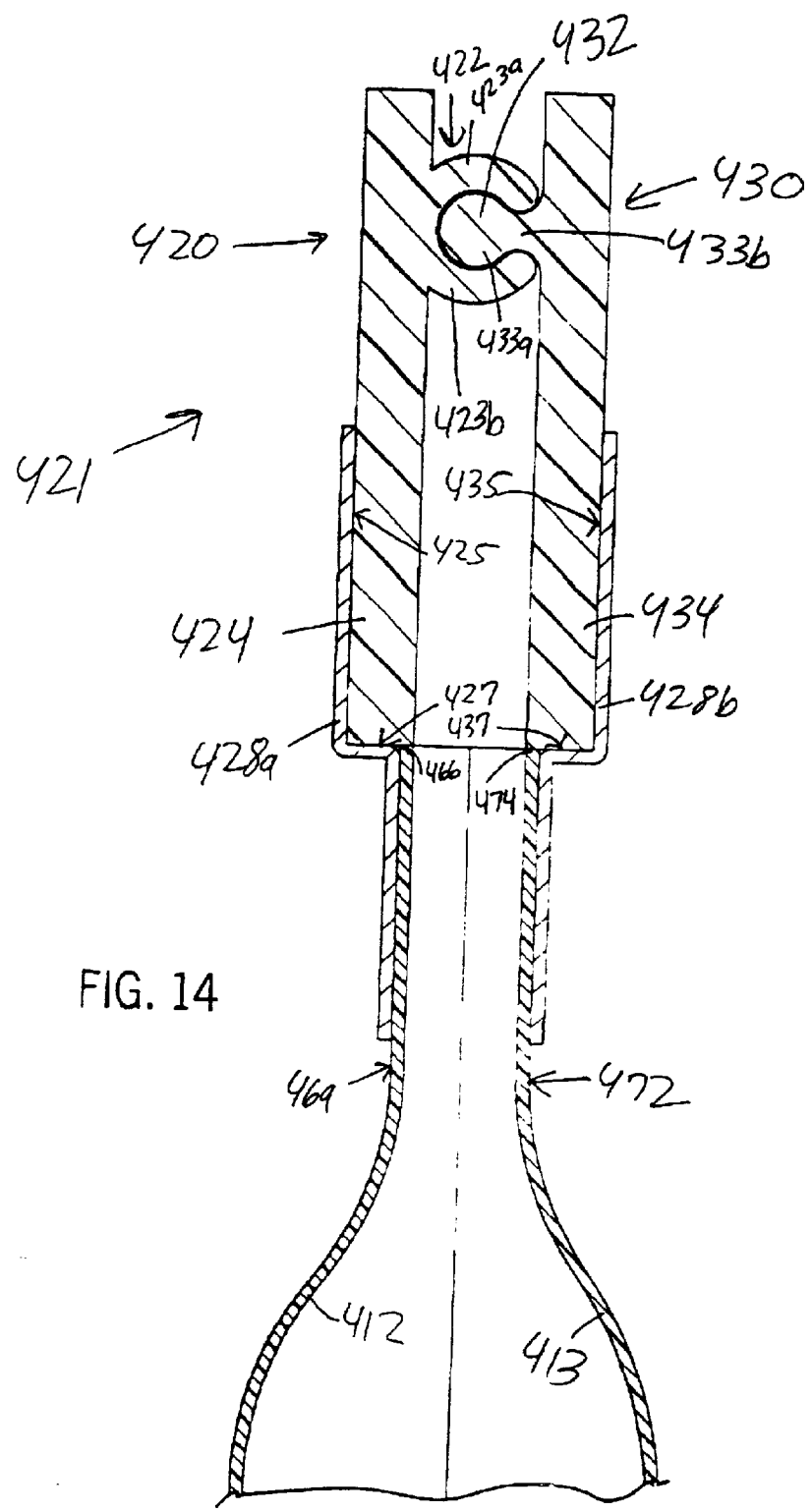
FIG. 14 is a partial cross sectional view of the closure arrangement of FIG. 13, albeit when the bag is closed.

Referring to FIGS. 13 and 14, there is shown yet another flexible bag 410 made of first and second opposed panel sections 412, 413 from a polymeric film. The sections are heat sealed together along a pair of side edges 415, 416, and a bottom edge 417 in order to form a pocket 419 within the interior of the bag 410. The pocket 419 may be used to hold a product 18, such as a variety of "left over" edible food substances, or non-edible products. Access to the interior of the bag 410 is provided through an opening 414.

Sections 412, 413 may be made of any thermoplastic resin capable of forming a flexible film. Specific thermoplastic resinous films are chosen to provide adequate tensile strength, tear strength, pressure resistance, impact strength, and the like, for the end use desired, at minimal cost for the selected use. Low or high density polyethylene, linear low density polyethylene, polypropylene, nylon, and interpolymers of ethylene and one or more monomers copolymerizable therewith are typically preferred. Suitable thicknesses generally fall within the range of 0.025 mm to 0.254 mm, preferably from about 0.038 mm to about 0.114 mm. The film can be formed from a single layer of thermoplastic resin or it may be formed as a multilayer structure.

Flexible bag 410 includes a zipper type closure 421 extending from side edge 415 to side edge 416. Female closure strip 420 includes an elongated inward profile 422 attached to or integrally formed with female closure strip 420, and the male closure strip 430 includes an elongated projecting profile 432 attached to or integrally formed with male closure strip 430. The inward profile 422 and the projecting profile 432 cooperate by snap interlocking to allow bag 410 to be opened and reclosed in the usual manner. As illustrated in FIG. 14, the projecting profile 432 has a cross section which is generally tree-shaped including an expanded head portion 433a and a narrower trunk portion 433b. The locking structure of the inward profile 422 includes first and second arcs 423a and 423b with a cross section which mechanically engage the head 433a of the male projecting profile 432 to reclose bag 410.

The female closure strip 420 also includes a flange portion 424, and the male closure strip 430 also includes a flange portion 434. The outer surface 425 of the flange portion 424 is configured for attachment to the panel 412 of the bag 410, and the outer surface 435 of the flange portion 434 is configured for attachment to the panel 413 of the bag 410. The zipper 421 is permanently attached to bag 410 by adhering the outer surface 425 of the flange portion 424 of the female closure strip 420 to the panel 412 via binder layer 428a, and adhering the outer surface 435 of the flange portion 434 of the male closure strip 430 to the panel 413 via binder layer 428b.

The female closure strip 420 and the male closure strip 430 of the zipper 421 can be made of any thermoplastic resin suitable for forming a reclosable bag zipper. Thermoplastic resins preferred for use in forming the zipper of the present invention include low or high density polyethylene, linear low density polyethylene, polypropylene, nylon, and interpolymers of ethylene and one or more monomers copolymerizable therewith. Suitable thicknesses for the flange portion 424 of the female closure strip 420 and for the flange portion 434 of the male closure strip 430 generally fall within the range of from about 0.076 mm to 0.305 mm, preferably from about 0.152 mm to 0.229 mm. Again, the female closure strip 420 and the male closure strip 430 can be formed from a single layer of thermoplastic resin or they may be formed as a multilayer structure having a plurality of layers.

The binder layer 428a and the binder layer 428b may comprise any thermoplastic resin suitable for bonding the male and female closure members and the film used to form the opposed panel sections 412, 413. Thermoplastic resins suitable for use in the binder layer 428a and the binder layer 428b of the present invention include low or high density polyethylene, linear low density polyethylene, polypropylene, nylon, and interpolymers of ethylene and one or more monomers copolymerizable therewith. Suitable thicknesses for the binder layers 428a/428b generally fall within the range of about 0.025 mm to about 0.152 mm, preferably from about 0.025 mm to 0.102 mm. The binder layers can be formed from a single layer of thermoplastic resin or may be formed as a multilayer structure having a plurality of layers. The width of the binder layer 428a and the binder layer 428b (as measured in a direction extending from the bottom edge 417 of the bag 410 toward the zipper 421) generally fall within the range of about 1.27 mm to 6.35 mm, preferably from about 3.175 mm to 4.445 mm.

Still referring to FIG. 14, it can be seen that the outer surface 425 the flange portion 424 of the female closure strip 420 is bonded to binder layer 428a which is bonded to an exterior surface 468 of the panel 412 such that the panel 412 is not in overlapping relationship (as defined above) with the female closure strip 420. Likewise, the outer surface 435 of the flange portion 434 of the male closure strip 430 is bonded to binder layer 428b which is bonded to an exterior surface 472 of the panel 413 such that the panel 413 is not in overlapping relationship (as defined above) with the male closure strip 420. In one form, an end 427 of the female closure strip 420 and an end 466 of the panel 412 are in abutting relationship, and an end 437 of the male closure strip 430 and an end 474 of the panel 413 are in abutting relationship.

The apparatus of FIG. 10 may be used to manufacture a bag film with closure members (one half of a zipper) on its opposed ends suitable for forming the reclosable bag 410 as in FIGS. 13 and 14. The methods are the same as for forming the reclosable bag 310 as in FIGS. 11 and 12, except that the female closure strip 420 is fed from the closure strip supply roll 88b with the profile 422 facing downward and the male closure strip 430 is fed from the closure strip supply roll 88a with the profile 432 facing downward.

While the foregoing description details reclosable bags 10, 110, 210, 310, 410 having a pinch and seal type zipper, the method and apparatus are equally useful for attaching zipper halves to thermoplastic film webs that are used to form reclosable plastic storage bags having a zipper slider. Reclosable plastic storage bags having a zipper slider are formed by folding a film web having a closure member (one half of a zipper) on its opposed ends to bring the zipper halves together, heat sealing the sides of the bag, and then attaching a slider that straddles the top of the zipper. Various methods are known for attaching the slider to the zipper such as those described in U.S. Pat. No. 5,067,208. A zipper slider can be provided on any of the reclosable bags 10, 110, 210, 310, 410 described above, although it is preferred that the longitudinal length of the upper flange area of the closure member above the profile be decreased (or the upper flange eliminated) when using a slider. The slider is slidably mounted straddling the zipper for movement between a closed position and an open position. Typically, the slider is adjacent to one of the pair of sides of the bag while in the closed position and is adjacent to the other of the pair of sides of the bag while in the open position. The female closure profile and the male closure profile are interlockingly engaged to each other in response to movement of the slider in a closing direction from the open position to the closed position, and the female closure profile and the male closure profile are disengaged from each other in response to movement of the slider in an opening direction from the closed position to the open position.

Thus, it can be seen that there is provided a method and apparatus for attaching prefabricated thermoplastic closure members to a prefabricated thermoplastic film web. The method and apparatus introduce less tension differences across the film web compared to "hot shoe" lamination, and improve the consistency of the seal between the closure members and the film web compared to prior methods.

The preceding description is merely of example embodiments of the invention. The claims should be looked to in order to understand the full scope of the invention.

INDUSTRIAL APPLICABILITY

Methods are disclosed for attaching closure elements such as zipper halves to thermoplastic film webs, particularly those used in forming reclosable plastic storage bags.

What is claimed is:

1. A method for forming a thermoplastic film having a closure, the method comprising the steps of:
    (a) providing a thermoplastic film web having a sealing surface, the temperature of the film web being below a melting temperature of the film web;
    (b) providing a thermoplastic closure having male and female closure strips that are not interlocked, wherein one of the closure strips includes a binding surface, the temperature of the one closure strip being below a melting temperature of the one closure strip;
    (c) extruding a thermoplastic binder layer;
    (d) positioning the film web and the one closure strip such that the film web and the one closure strip are not in overlapping relationship;
    (e) positioning the binder layer on the sealing surface of the film web and on the binding surface of the one closure strip while the male and female closure strips are not interlocked such that the binder layer contacts the sealing surface of the film web before the binder layer has cooled to a temperature below the melting temperature of the film web and the binder layer contacts the binding surface of the one closure strip before the binder layer has cooled to a temperature below the melting temperature of the one closure strip; and
    (f) thereafter applying pressure to the binder layer so as to bind the one closure strip and film web to the binder layer.

2. The method of claim 1, wherein:
    step (f) comprises thereafter applying pressure to the one closure strip, the film web and the binder layer so as to bind the one closure strip and film web to the binder layer.

3. The method of claim 1, wherein:
    step (b) comprises providing a thermoplastic female closure strip having a first binding surface and providing a thermoplastic male closure strip having a second binding surface, the temperature of both closure strips being below their respective melting temperatures;
    step (c) comprises extruding a first thermoplastic binder layer and extruding a second thermoplastic binder layer; and
    step (e) comprises positioning the first binder layer on a first sealing surface of the film web and the first binding surface of the female closure strip such that the first binder layer contacts the first sealing surface of the film web before the first binder layer has cooled to a temperature below the melting temperature of the film web and the first binder layer contacts the first binding surface of the female closure strip before the first binder layer has cooled to a temperature below the melting temperature of the female closure strip, and positioning the second binder layer on a second sealing surface of the film web and the second binding surface of the male closure strip such that the second binder layer contacts the second sealing surface of the film web before the second binder layer has cooled to a temperature below the melting temperature of the film web and the second binder layer contacts the second binding surface of the male closure strip before the second binder layer has cooled to a temperature below the melting temperature of the male closure strip; and
    step (f) comprises thereafter applying pressure to the first binder layer and the second binder layer so as to bind the film web and the female closure strip to the first binder layer and bind the film web and the male closure strip to the second binder layer.

4. The method of claim 1, wherein the film has a thickness of between 0.025 millimeters and 0.254 millimeters.

5. The method of claim 1, wherein the binder layer has a thickness of between 0.025 millimeters and 0.152 millimeters.

6. A method for forming a thermoplastic film having a closure, the method comprising the steps of:
    (a) providing a first cylindrical roller having a surface and an axis of rotation and a second cylindrical roller having a surface and an axis of rotation, the axis of the first roller and the axis of the second roller being substantially coplanar, the first roller and the second roller being aligned in spaced apart relationship such that a pinch area is formed between the surface of the first roller and the surface of the second roller;

(b) feeding a continuous length of a thermoplastic film web having a sealing surface such that the film web wraps on the surface of the first roller while the temperature of the film web is below a melting temperature of the film web;

(c) feeding a continuous length of a thermoplastic closure having male and female closure strips that are not interlocked, wherein one of the closure strips includes a binding surface such that the one closure strip wraps on the surface of the second roller while the temperature of the one closure strip is below a melting temperature of the one closure strip;

(d) extruding a thermoplastic binder layer;

(e) positioning the binder layer on the sealing surface of the film web and on the binding surface of the one closure strip; and (f) feeding the film web, the binder layer and the one closure strip through the pinch area while the male and female closure strips are not interlocked such that the film web and the one closure strip are not in overlapping relationship and such that the binder layer contacts the sealing surface of the film web before the binder layer has cooled to a temperature below the melting temperature of the film web and the binder layer contacts the binding surface of the one closure strip before the binder layer has cooled to a temperature below the melting temperature of the one closure strip.

7. The method of claim 6, wherein:

step (e) comprises applying the binder layer to the binding surface of the one closure strip before the one closure strip reaches the pinch area; and step (f) comprises feeding the film web and the one closure strip through the pinch area to create pressure on the film web and the one closure strip such that the binder layer contacts the sealing surface of the film web before the binder layer has cooled to a temperature below the melting temperature of the film web and the binder layer contacts the binding surface of the one closure strip before the binder layer has cooled to a temperature below the melting temperature of the one closure strip.

* * * * *